US012665412B2

(12) United States Patent (10) Patent No.: US 12,665,412 B2
Zhang et al. (45) Date of Patent: Jun. 23, 2026

(54) PHOTOVOLTAIC SYSTEM, DIRECT-CURRENT COMBINER BOX, AND FAULT ISOLATION METHOD

(71) Applicant: Huawei Digital Power Technologies Co., Ltd., Shenzhen (CN)

(72) Inventors: Fangpo Zhang, Shanghai (CN); Tiansan Lin, Shenzhen (CN); Xiufeng Zhang, Dongguan (CN); Jinxiang Zhan, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 127 days.

(21) Appl. No.: 18/452,352

(22) Filed: Aug. 18, 2023

(65) Prior Publication Data

US 2023/0396057 A1     Dec. 7, 2023

Related U.S. Application Data

(63) Continuation of application No. PCT/CN2021/076962, filed on Feb. 20, 2021.

(51) Int. Cl.
*H02H 7/20* (2006.01)
*H02J 3/38* (2026.01)
(Continued)

(52) U.S. Cl.
CPC .............. *H02H 7/20* (2013.01); *H02J 3/381* (2013.01); *H02S 40/36* (2014.12); *H02S 50/10* (2014.12); *H02J 2101/24* (2026.01)

(58) Field of Classification Search
CPC . H02H 7/20; H02S 40/36; H02S 50/10; H02J 3/381; H02J 2300/24
See application file for complete search history.

(56) References Cited

U.S. PATENT DOCUMENTS 12,095,256 B2 * 9/2024 Zhang ................... H02M 3/158
2017/0229856 A1    8/2017  Schulze

FOREIGN PATENT DOCUMENTS

CN        103140765 A     6/2013
CN        104934927 A     9/2015
(Continued)

OTHER PUBLICATIONS

Electronics-Tutorials, Full Wave Rectifier with Smoothing Capacitor, Jan. 2013 (Year: 2013).*
EP2296244A1 (Year: 2011).*

*Primary Examiner* — Crystal L Hammond
*Assistant Examiner* — Samantha L Faubert
(74) *Attorney, Agent, or Firm* — Slater Matsil, LLP

(57)     ABSTRACT

This application discloses a photovoltaic system, a direct-current combiner box, and a fault isolation method. The photovoltaic system includes a fault isolation circuit and a DC/DC conversion circuit. A first end of the fault isolation circuit is connected to N photovoltaic strings, and a second end of the fault isolation circuit is connected to an input end of the DC/DC conversion circuit. The fault isolation circuit includes a multipole switch, and each group of photovoltaic strings in the N photovoltaic strings is connected to an input end of a power conversion circuit through one pole of switch in the multipole switch. Each group of photovoltaic strings includes at least two photovoltaic strings. When a reverse connection fault occurs in the N photovoltaic strings, the entire multipole switch is turned off in linkage.

20 Claims, 13 Drawing Sheets

(51) Int. Cl.
*H02J 101/24* (2026.01)
*H02S 40/36* (2014.01)
*H02S 50/10* (2014.01)

(56) References Cited

FOREIGN PATENT DOCUMENTS

| | | | | | | |
|----|------------|----|---|---------|-----------|------------|
| CN | 105977952  | A  |   | 9/2016  |           |            |
| CN | 205961056  | U  |   | 2/2017  |           |            |
| CN | 206117592  | U  |   | 4/2017  |           |            |
| CN | 109342948  | A  |   | 2/2019  |           |            |
| CN | 109546642  | A  |   | 3/2019  |           |            |
| CN | 110729714  | A  |   | 1/2020  |           |            |
| CN | 210053200  | U  |   | 2/2020  |           |            |
| CN | 111224391  | A  | * | 6/2020  |           |            |
| EP | 2296244    | A1 | * | 3/2011  | ......... | H02J 3/381 |
| EP | 2960945    | A3 |   | 4/2016  |           |            |
| KR | 20180077589 | A |   | 7/2018  |           |            |
| KR | 101913546  | B1 |   | 10/2018 |           |            |
| WO | 2021017654 | A1 |   | 2/2021  |           |            |

* cited by examiner

PHOTOVOLTAIC SYSTEM, DIRECT-CURRENT COMBINER BOX, AND FAULT ISOLATION METHOD

CROSS-REFERENCE TO RELATED APPLICATIONS

This application is a continuation of International Application No. PCT/CN2021/076962, filed on Feb. 20, 2021, the disclosure of which is hereby incorporated by reference in its entirety.

TECHNICAL FIELD

This application relates to the field of photovoltaic power generation technologies, and in particular, to a photovoltaic system, a direct-current combiner box, and a fault isolation method.

BACKGROUND

Currently, a photovoltaic system mainly includes a single-stage power conversion mode and a two-stage power conversion mode. In the single-stage power conversion mode, a direct current of a photovoltaic array is directly converted into an alternating current through a direct current/alternating current (DC/AC) circuit. In the two-stage power conversion mode, a direct current of a photovoltaic array first undergoes first-stage direct current/direct current conversion through a direct current/direct current (DC/DC) conversion circuit, and then undergoes second-stage direct current/alternating current conversion through a second-stage DC/AC conversion circuit, to be finally converted into an alternating current. The two-stage power conversion mode is more efficient than the single-stage power conversion mode. Therefore, the two-stage power conversion mode is increasingly widely used in a photovoltaic power generation system.

Usually, a single photovoltaic string has a limited capacity. To increase a capacity, a plurality of photovoltaic strings are connected to an input end of a DC/DC conversion circuit in parallel. To be specific, positive electrodes of the plurality of photovoltaic strings are connected together, and negative electrodes of the plurality of photovoltaic strings are connected together. However, when one of the photovoltaic strings is reversely connected, currents of other photovoltaic strings backflow to the reversely connected photovoltaic string. Because an antiparallel diode of a photovoltaic module in a photovoltaic string can carry a limited current, when currents of a plurality of photovoltaic strings backflow to one photovoltaic string, a photovoltaic module in the photovoltaic string is damaged.

SUMMARY

This application provides a photovoltaic system, a direct-current combiner box, and a fault isolation method, to isolate a fault in a timely manner when a photovoltaic string is reversely connected.

An embodiment of this application provides a photovoltaic system. The photovoltaic system may be in a single-stage power conversion mode or a two-stage power conversion mode. The photovoltaic system includes a fault isolation circuit and a power conversion circuit, where the power conversion circuit may include a DC/DC conversion circuit and a DC/AC conversion circuit, or may include only a DC/AC conversion circuit. The fault isolation circuit is connected between a photovoltaic string and the power conversion circuit, that is, N photovoltaic strings are connected to the power conversion circuit through the fault isolation circuit. To reduce a quantity of switches and increase an input current of the power conversion circuit, the fault isolation circuit may include a multipole switch. The N photovoltaic strings are divided into a plurality of groups, and each group of photovoltaic strings corresponds to one pole of switch in the multipole switch. That is, all photovoltaic strings in each group of photovoltaic strings are connected to an input end of the power conversion circuit through one pole of switch. Each group of photovoltaic strings includes at least two photovoltaic strings. Provided that a reverse connection fault occurs in the N photovoltaic strings, the entire multipole switch is turned off in linkage.

The fault isolation circuit provided in this embodiment of this application includes the multipole switch. The multipole switch is a linkage switch as a whole, namely, a multi-P switch. The multi-P switch is turned off or turned on as a whole. When a reverse connection fault occurs in the N photovoltaic strings, the entire multipole switch is turned off. To be specific, provided that a reverse connection fault occurs in one of the photovoltaic strings, all poles of switches in the fault isolation circuit are turned off. At least two photovoltaic strings form a group, and each group corresponds to one pole of switch. To be specific, each group of photovoltaic strings are connected in parallel, and are connected to the input end of the power conversion circuit through one pole of switch. Therefore, a quantity of poles of switches in the fault isolation circuit is reduced to some extent, so that complexity of a hardware structure is reduced, and costs of the fault isolation circuit are reduced.

In a possible implementation, positive electrodes or negative electrodes of the N photovoltaic strings may be connected. For example, when the positive electrodes of the N photovoltaic strings are connected, the positive electrodes of the N photovoltaic strings are connected together, the positive electrodes of the N photovoltaic strings are connected to the input end of the power conversion circuit through one pole of switch in the multipole switch, every two of the N photovoltaic strings form a group, and negative electrodes of each group of photovoltaic strings are connected to the input end of the power conversion circuit through one pole of switch in the multipole switch. For example, when the negative electrodes of the N photovoltaic strings are connected, the negative electrodes of the N photovoltaic strings are connected together, the negative electrodes of the N photovoltaic strings are connected to the input end of the power conversion circuit through one pole of switch in the multipole switch, every two of the N photovoltaic strings form a group, and positive electrodes of each group of photovoltaic strings are connected to the input end of the power conversion circuit through one pole of switch in the multipole switch.

Every two of the N photovoltaic strings form a group. To be specific, each group of photovoltaic strings includes two photovoltaic strings, and each group of photovoltaic strings corresponds to one pole of switch. Therefore, a quantity of poles of switches is nearly half of a quantity of photovoltaic strings. This greatly reduces a quantity of switches, simplifies circuit connections, and reduces hardware costs of the fault isolation circuit. Because the multipole switch can operate in linkage, when a reverse connection fault occurs in one or more photovoltaic strings, all photovoltaic strings can be reliably disconnected from the power conversion circuit, to protect the photovoltaic strings and the power conversion circuit.

In a possible implementation, the N photovoltaic strings are divided into M groups. When N is an even number, M=N/2; or when N is an odd number, M=(N+1)/2. The fault isolation circuit includes an (M+1)-pole switch. The (M+1)-pole switch includes a first pole of switch and other M poles of switches. The M groups of photovoltaic strings are in a one-to-one correspondence with the M poles of switches. First ends of the N photovoltaic strings are all connected to the input end of the power conversion circuit through the first pole of switch. The M groups of photovoltaic strings are connected to the input end of the power conversion circuit through the M poles of switches respectively. The first ends of the N photovoltaic strings are the positive electrodes or the negative electrodes. That is, M is approximately half of N, and the quantity of poles of switches in the fault isolation circuit is less than the quantity of photovoltaic strings. Therefore, the quantity of poles of switches is greatly reduced, and hardware costs are reduced. In addition, because the positive electrodes or the negative electrodes of the N photovoltaic strings are connected, the input current of the power conversion circuit is a sum of currents of the N photovoltaic strings. Therefore, the input current of the power conversion circuit can be increased.

In a possible implementation, to reliably turn off the switch in the fault isolation circuit when a reverse connection fault occurs in a photovoltaic string, the fault isolation circuit provided in this embodiment of this application may further include: a shunt tripping apparatus; and a controller, configured to: when a reverse connection fault occurs in the N photovoltaic strings, send a disconnection instruction to the shunt tripping apparatus. The shunt tripping apparatus acts according to the disconnection instruction and drives the entire (M+1)-pole switch to be turned off. The entire (M+1)-pole switch remains in an off state before the shunt tripping apparatus is reset. To be specific, before the shunt tripping apparatus is reset, the multipole switch remains in the off state, so as to prevent the multipole switch from being turned on due to misoperation before the fault is rectified.

In a possible implementation, whether a reverse connection fault occurs in a photovoltaic string may be determined based on a current direction of the photovoltaic string. When the current direction of the photovoltaic string is reverse, it indicates that a reverse connection fault occurs. To be specific, the photovoltaic system provided in this embodiment may further include an input current detection circuit, configured to detect a current of each of the N photovoltaic strings. When determining, based on the current of each photovoltaic string, that a current of any one of the N photovoltaic strings is reverse, the controller controls the entire (M+1)-pole switch to be turned off.

In a possible implementation, the photovoltaic system further includes an input current detection circuit and an input voltage detection circuit. The input current detection circuit detects a current of each of the N photovoltaic strings. The input voltage detection circuit detects a voltage between a first end of the first pole of switch and a first end of each of the M poles of switches to obtain M voltages. The controller is configured to: when at least one of the M voltages is less than a first voltage threshold and a current of at least one of the N photovoltaic strings is greater than a first current threshold, control the entire (M+1)-pole switch to be turned off. Provided that a voltage of a group of photovoltaic strings is low, a short-circuit fault may have occurred in a photovoltaic string. It should be understood that, when the short-circuit fault occurs, a voltage of the photovoltaic string decreases, and a current increases. To accurately identify a short-circuit fault, determining may be performed based on both a voltage and a current. Provided that a short-circuit fault occurs in a photovoltaic string, all switches in the fault isolation circuit are turned off, to isolate the faulty photovoltaic string and prevent a next-stage circuit from being damaged due to the short-circuit fault.

In a possible implementation, the power conversion circuit includes a DC/DC conversion circuit. To be specific, the photovoltaic strings are connected to an input end of the DC/DC conversion circuit through the fault isolation circuit, and an output end of the DC/DC conversion circuit is connected to an input end of a DC/AC conversion circuit.

In a possible implementation, in this embodiment of this application, whether a short-circuit fault occurs at the input end of the DC/DC conversion circuit can be detected, and whether a short-circuit fault occurs at the output end of the DC/DC conversion circuit can also be detected. When a short-circuit fault occurs at the output end of the DC/DC conversion circuit, to prevent extension of a fault range and implement protection, all poles of switches in the fault isolation circuit also need to be controlled to be turned off, to implement fault isolation. To be specific, the photovoltaic system provided in this embodiment further includes: an output current detection circuit, configured to detect a current at a second end of the first pole of switch; and an output voltage detection circuit, configured to detect an output voltage of the DC/DC conversion circuit. The controller is configured to: when the current at the second end of the first pole of switch is greater than a second current threshold and a voltage at the output end of the DC/DC conversion circuit is lower than a second preset voltage, control the entire (M+1)-pole switch to be turned off.

In a possible implementation, because any hardware may be faulty during operation, to ensure secure and reliable operation of the photovoltaic system, two controllers may be disposed in the photovoltaic system to provide a backup, that is, implement redundancy control. When one of the controllers fails, normal control operation is not affected. To be specific, in the photovoltaic system provided in this embodiment, the controller includes a primary controller and a secondary controller. Both the primary controller and the secondary controller are configured to: when a reverse connection fault occurs in the N photovoltaic strings, control the entire (M+1)-pole switch to be turned off.

In a possible implementation, to ensure reliability of power supply, this embodiment of this application provides two auxiliary sources to supply power to the controller. To be specific, the photovoltaic system provided in this embodiment further includes a primary auxiliary source and a secondary auxiliary source. Both the primary auxiliary source and the secondary auxiliary source are configured to supply power to the primary controller and the secondary controller. The primary auxiliary source is connected to the output end of the DC/DC conversion circuit. The secondary auxiliary source is connected to the first end of the fault isolation circuit.

In a possible implementation, to reliably supply power to the controller in any cases, the photovoltaic system provided in this embodiment of this application obtains power through contention, to be specific, further includes a first power obtaining circuit, configured to obtain power from a group of photovoltaic strings with a highest voltage in the M groups of photovoltaic strings to supply power to the secondary auxiliary source.

In a possible implementation, the first power obtaining circuit includes $2\times(M+1)$ diodes and a first capacitor. Each pole of switch in the (M+1)-pole switch corresponds to two of the $2\times(M+1)$ diodes. The first end of each pole of switch in the (M+1)-pole switch is connected to a first end and a second end of the first capacitor through a forward bias diode and a reverse bias diode respectively. The first end of each pole of switch in the (M+1)-pole switch is connected to a corresponding photovoltaic string. A second end of each pole of switch in the (M+1)-pole switch is connected to the input end of the DC/DC conversion circuit.

In a possible implementation, the photovoltaic system provided in this embodiment of this application further includes a second power obtaining circuit for supplying power to the primary auxiliary source. The second power obtaining circuit includes a first diode, a second diode, a third diode, a fourth diode, and a second capacitor. A cathode and an anode of the first diode are connected to a positive output end of the DC/DC conversion circuit and a first end of the second capacitor respectively. An anode and a cathode of the second diode are connected to the positive output end of the DC/DC conversion circuit and a second end of the second capacitor respectively. An anode and a cathode of the third diode are connected to the first end of the second capacitor and a negative output end of the DC/DC conversion circuit respectively. An anode and a cathode of the fourth diode are connected to the negative output end of the DC/DC conversion circuit and the second end of the second capacitor respectively. The primary auxiliary source is connected to the positive output end of the DC/DC conversion circuit. The primary auxiliary source obtains power from the output end of the DC/DC conversion circuit. In addition, the photovoltaic system usually includes a plurality of DC/DC conversion circuits, and output ends of the plurality of DC/DC conversion circuits are connected in parallel. Therefore, even if all poles of switches in the fault isolation circuit are turned off to isolate all photovoltaic strings connected to the input end of the DC/DC conversion circuit, the output end of the DC/DC conversion circuit can still provide power, which comes from another DC/DC conversion circuit connected to the DC/DC conversion circuit in parallel. This can ensure power supply for the primary auxiliary source, and therefore ensure power supply for the controller.

In a possible implementation, the photovoltaic system includes a plurality of fault isolation circuits and a plurality of DC/DC conversion circuits, and the plurality of fault isolation circuits are in a one-to-one correspondence with the plurality of DC/DC conversion circuits.

In a possible implementation, the power conversion circuit includes a DC/AC conversion circuit.

Based on the photovoltaic system provided in the foregoing embodiment, an embodiment of this application further provides a direct-current combiner box, including a plurality of fault isolation circuits and a plurality of DC/DC conversion circuits. The plurality of fault isolation circuits are in a one-to-one correspondence with the plurality of DC/DC conversion circuits. A first end of each fault isolation circuit is connected to N photovoltaic strings, and a second end of each fault isolation circuit is connected to an input end of a DC/DC conversion circuit. Each fault isolation circuit includes a multipole switch, and each group of photovoltaic strings in the N photovoltaic strings is connected to an input end of a corresponding power conversion circuit through one pole of switch in the multipole switch. Each group of photovoltaic strings includes at least two photovoltaic strings. When a reverse connection fault occurs in the N photovoltaic strings, the entire multipole switch is turned off in linkage.

In a possible implementation, each fault isolation circuit further includes a shunt tripping apparatus and a controller. The controller is configured to: when a reverse connection fault occurs in the N photovoltaic strings, send a disconnection instruction to the shunt tripping apparatus. The shunt tripping apparatus acts according to the disconnection instruction and drives the multipole switch to be turned off. The multipole switch remains in an off state before the shunt tripping apparatus is reset.

Based on the photovoltaic system and the direct-current combiner box provided in the foregoing embodiments, an embodiment of this application further provides a fault isolation method, applied to the photovoltaic system. The photovoltaic system includes a fault isolation circuit and a power conversion circuit. A first end of the fault isolation circuit is configured to connect to N photovoltaic strings, and a second end of the fault isolation circuit is connected to the power conversion circuit. The fault isolation circuit includes a multipole switch, and each group of photovoltaic strings in the N photovoltaic strings is connected to an input end of the power conversion circuit through one pole of switch in the multipole switch. Each group of photovoltaic strings includes at least two photovoltaic strings. The method includes: determining that a reverse connection fault occurs in the N photovoltaic strings, and controlling the entire multipole switch to be turned off in linkage.

In a possible implementation, the determining that a reverse connection fault occurs in the N photovoltaic strings specifically includes: obtaining a current of each of the N photovoltaic strings; and determining, based on the current of each photovoltaic string, that a current of any one of the N photovoltaic strings is reverse, and determining that a reverse connection fault occurs in the N photovoltaic strings.

It can be learned from the foregoing technical solutions that embodiments of this application have the following advantages:

The photovoltaic system includes the fault isolation circuit, and the fault isolation circuit is connected between the photovoltaic strings and the power conversion circuit, that is, the photovoltaic strings are connected to the power conversion circuit through the fault isolation circuit. When a reverse connection fault occurs in the photovoltaic strings, the fault isolation circuit acts to disconnect the photovoltaic strings from the power conversion circuit. The fault isolation switch provided in embodiments of this application includes the multipole switch. The multipole switch is a linkage switch as a whole, namely, a multi-P switch. The multi-P switch is turned off or turned on as a whole. When a reverse connection fault occurs in the N photovoltaic strings, the entire multipole switch is turned off. To be specific, provided that a reverse connection fault occurs in one of the photovoltaic strings, all poles of switches in the fault isolation circuit are turned off. At least two photovoltaic strings form a group, and each group corresponds to one pole of switch. To be specific, each group of photovoltaic strings are connected in parallel, and are connected to the input end of the power conversion circuit through one pole of switch. Therefore, a quantity of poles of switches in the fault isolation circuit is reduced to some extent, so that complexity of a hardware structure is reduced, and costs of the fault isolation circuit are reduced.

Figure 2:
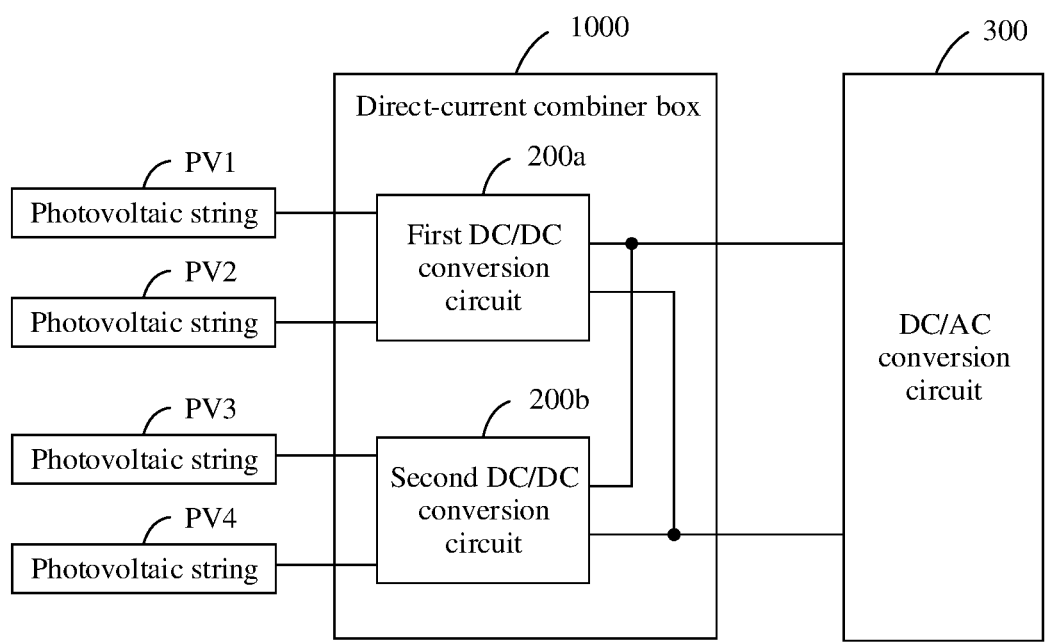
Figure 3:
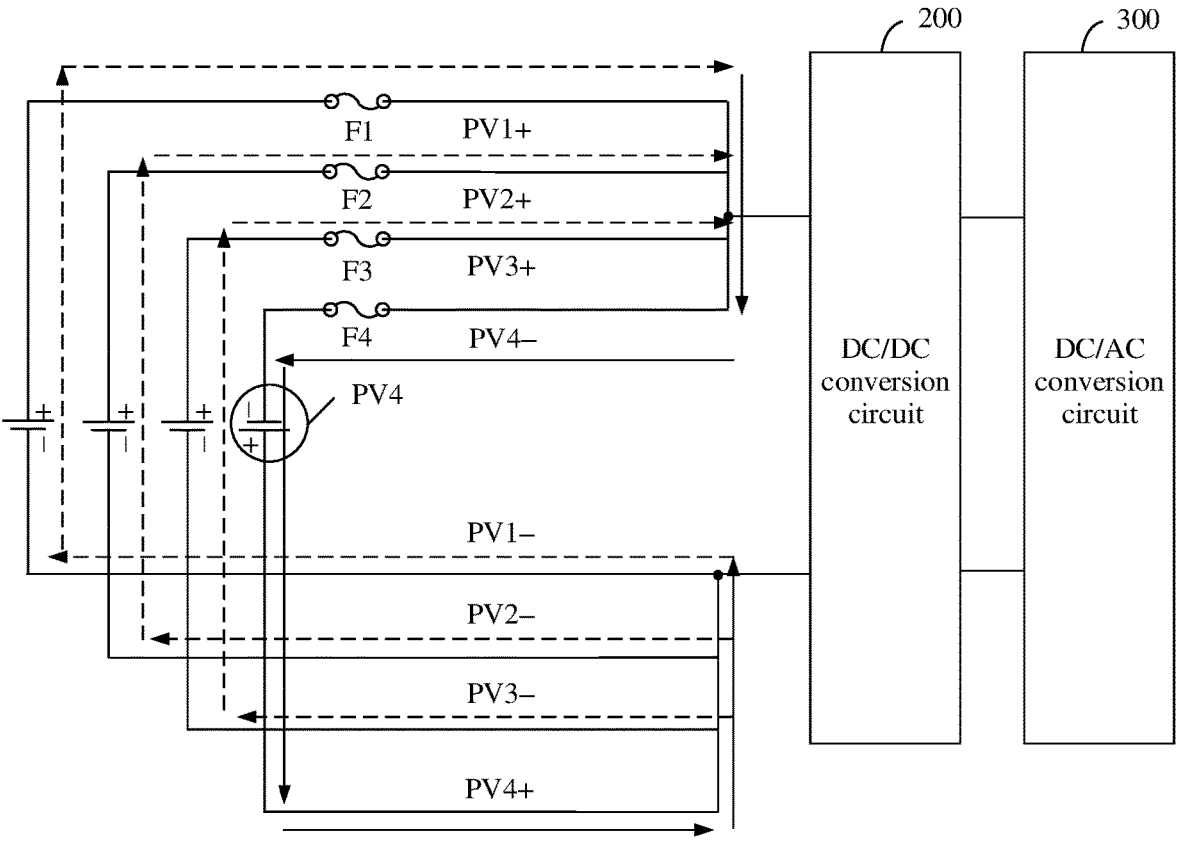
Figure 4:
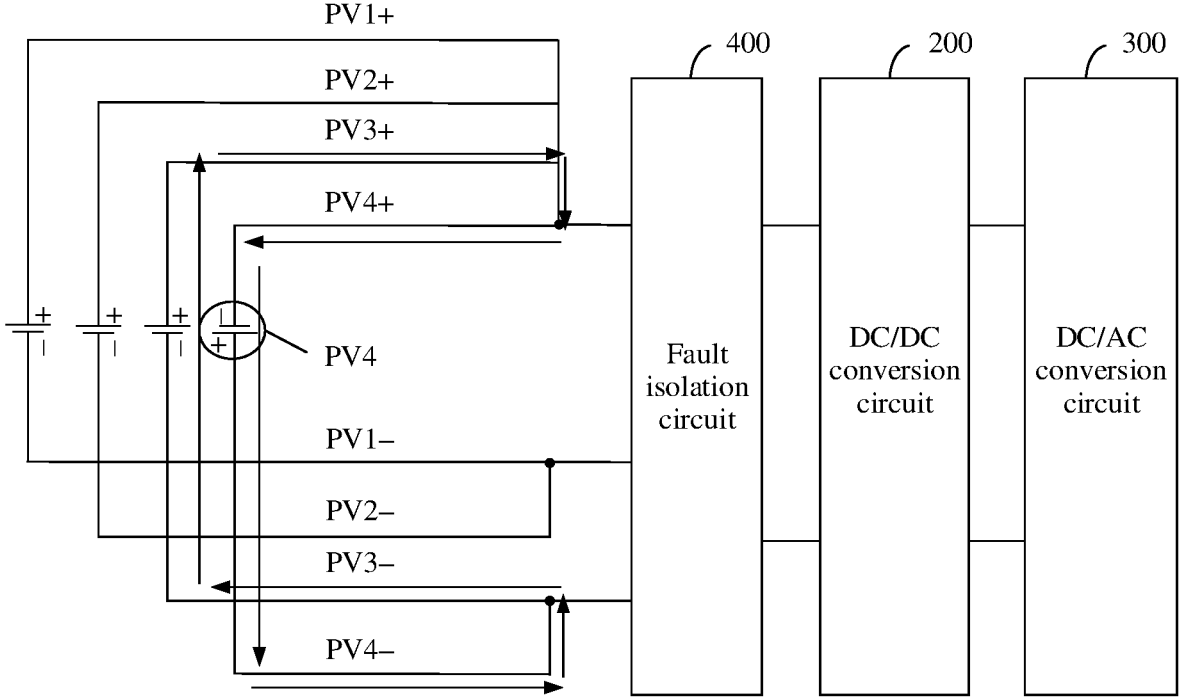
Figure 5:
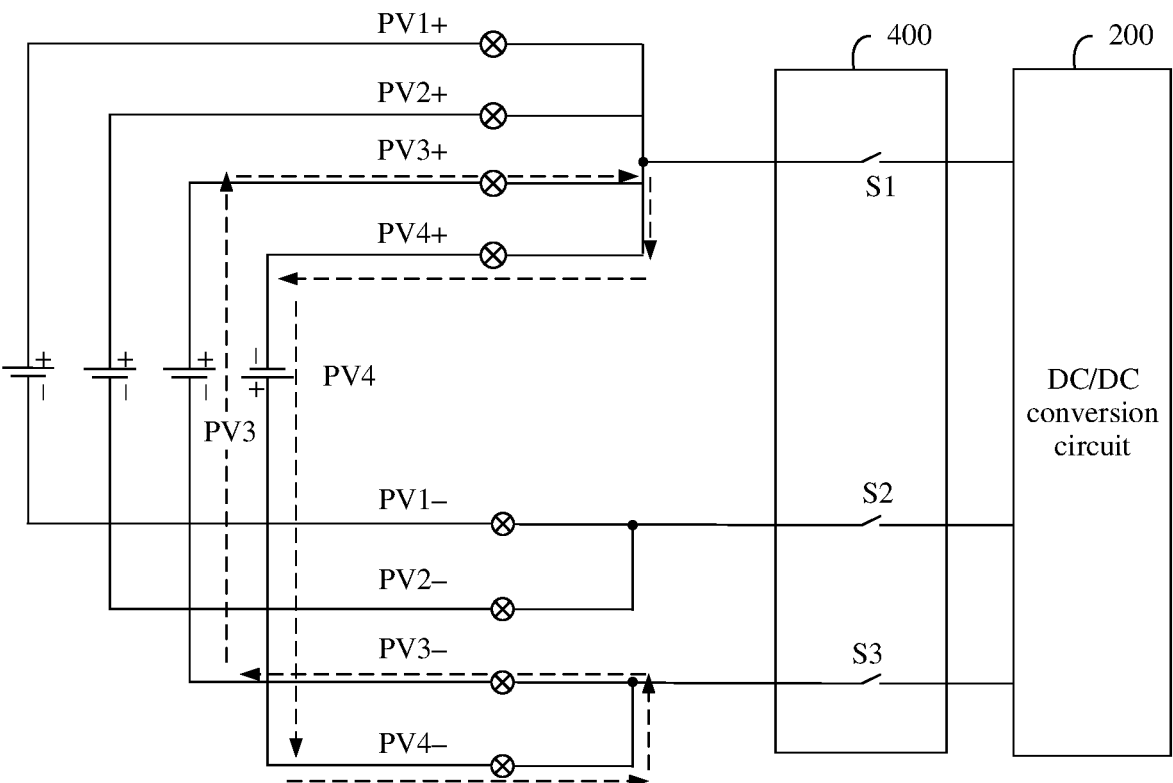
Figure 6:
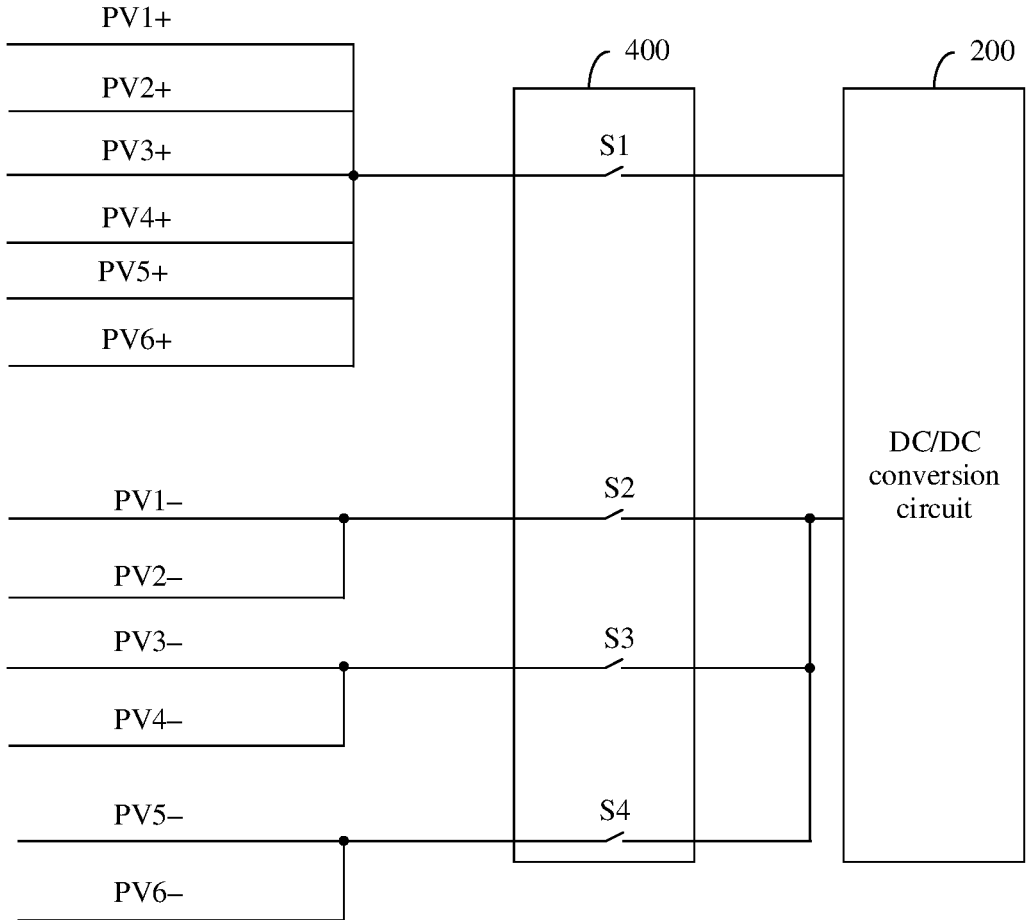
Figure 7:
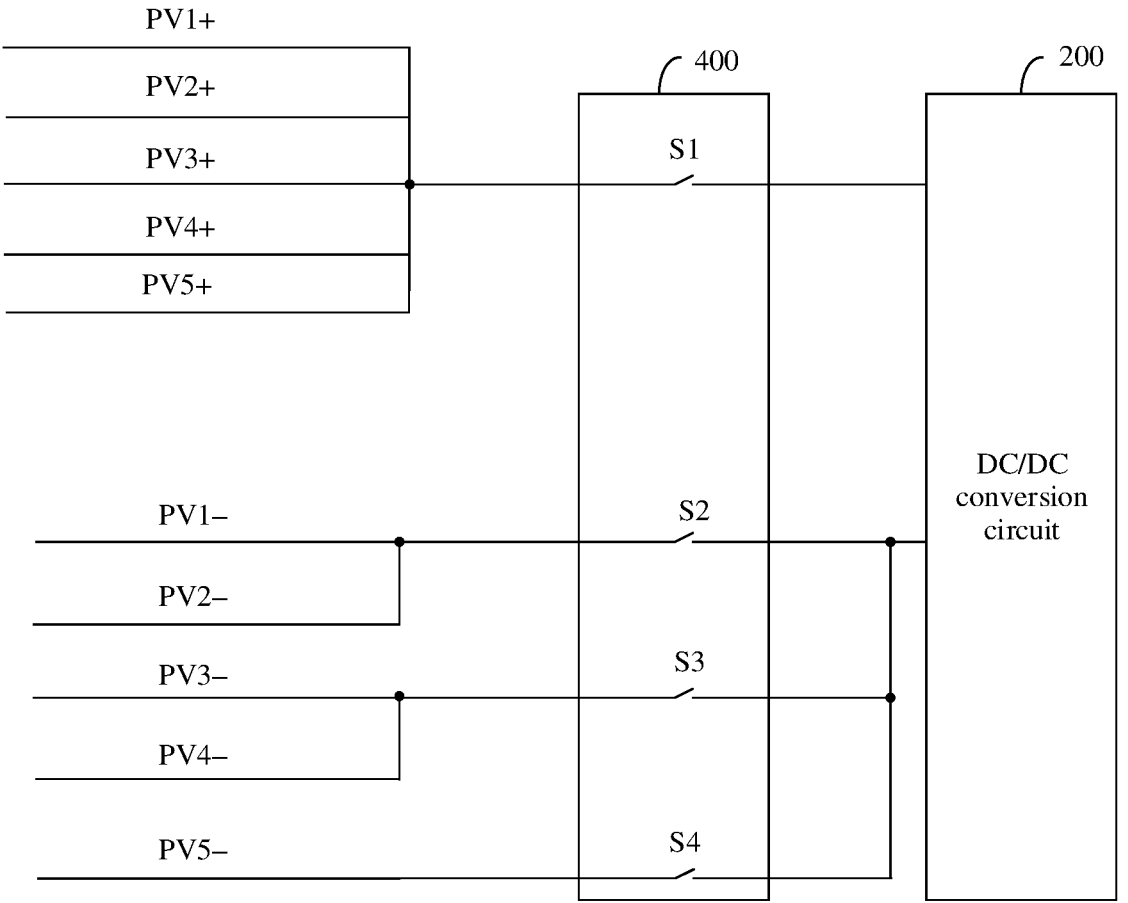
Figure 8:
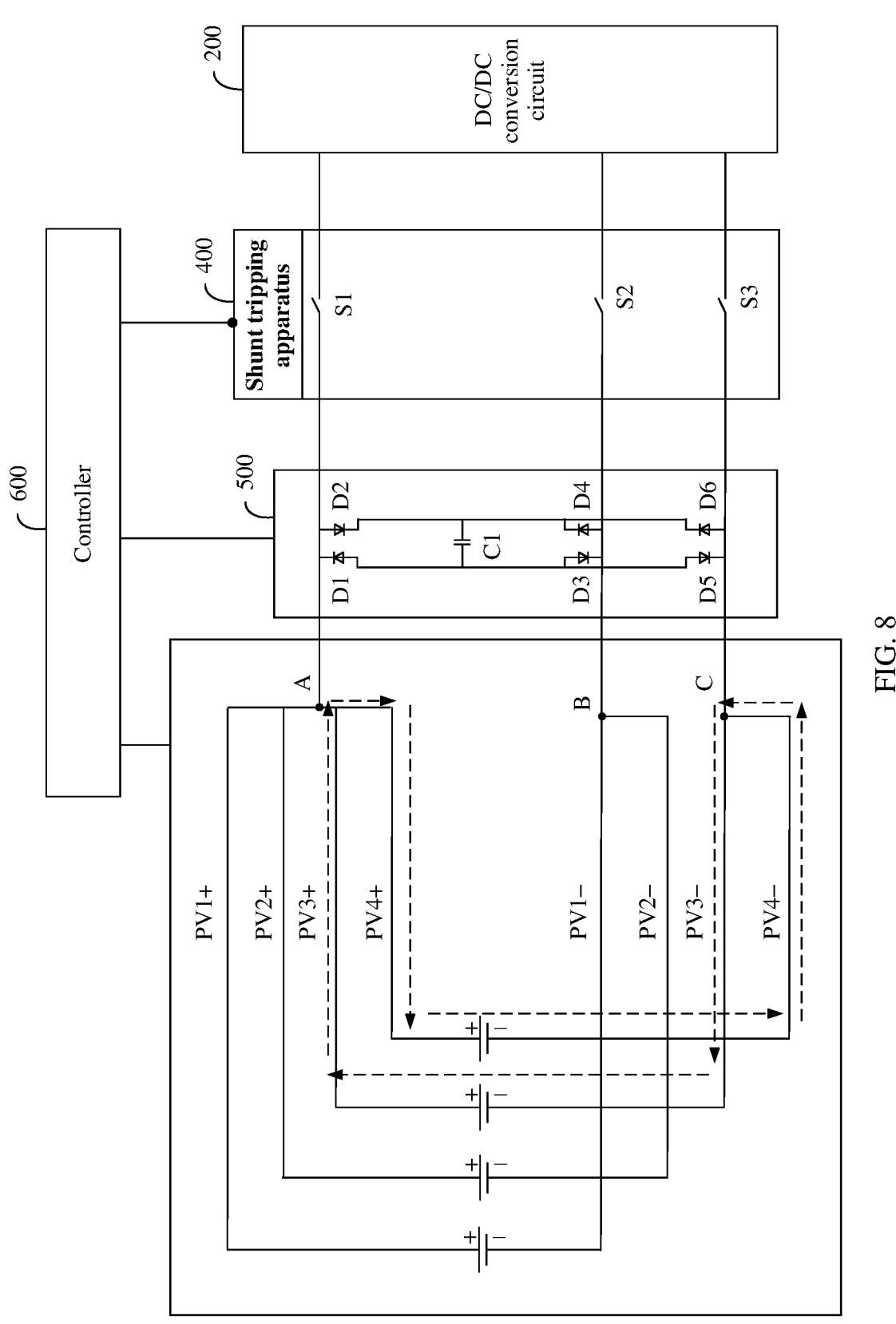
Figure 9:
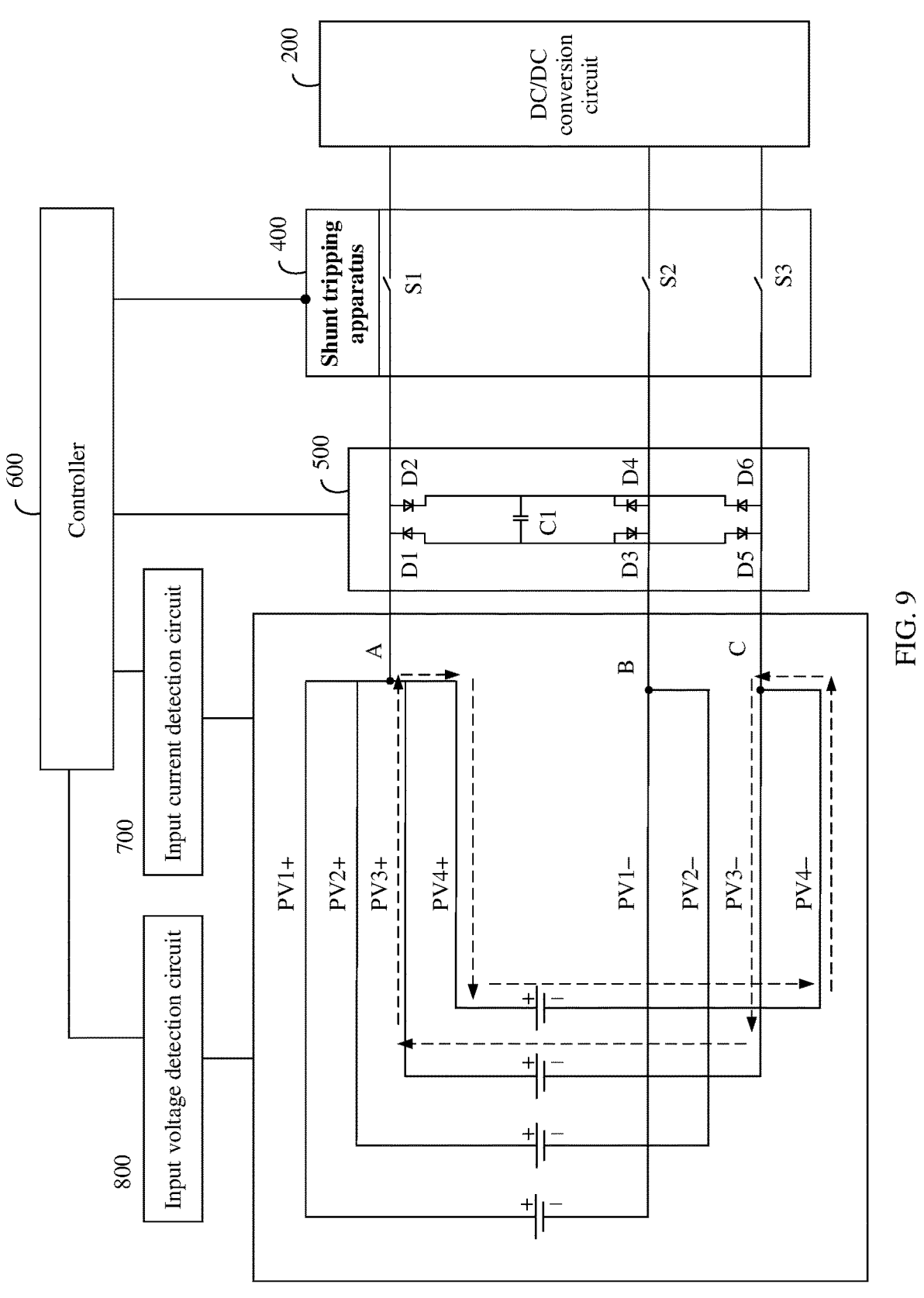
Figure 10:
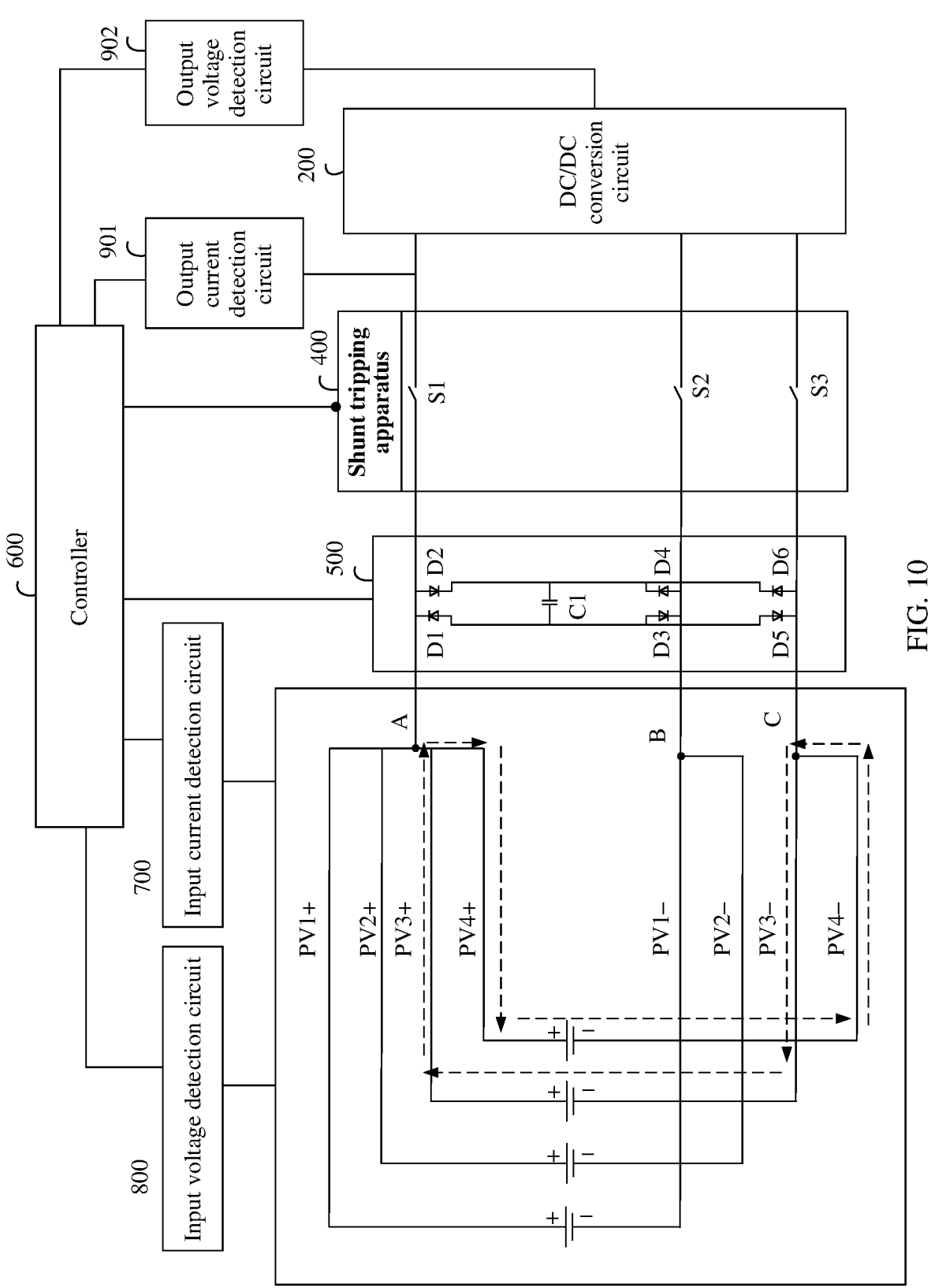
Figure 11:
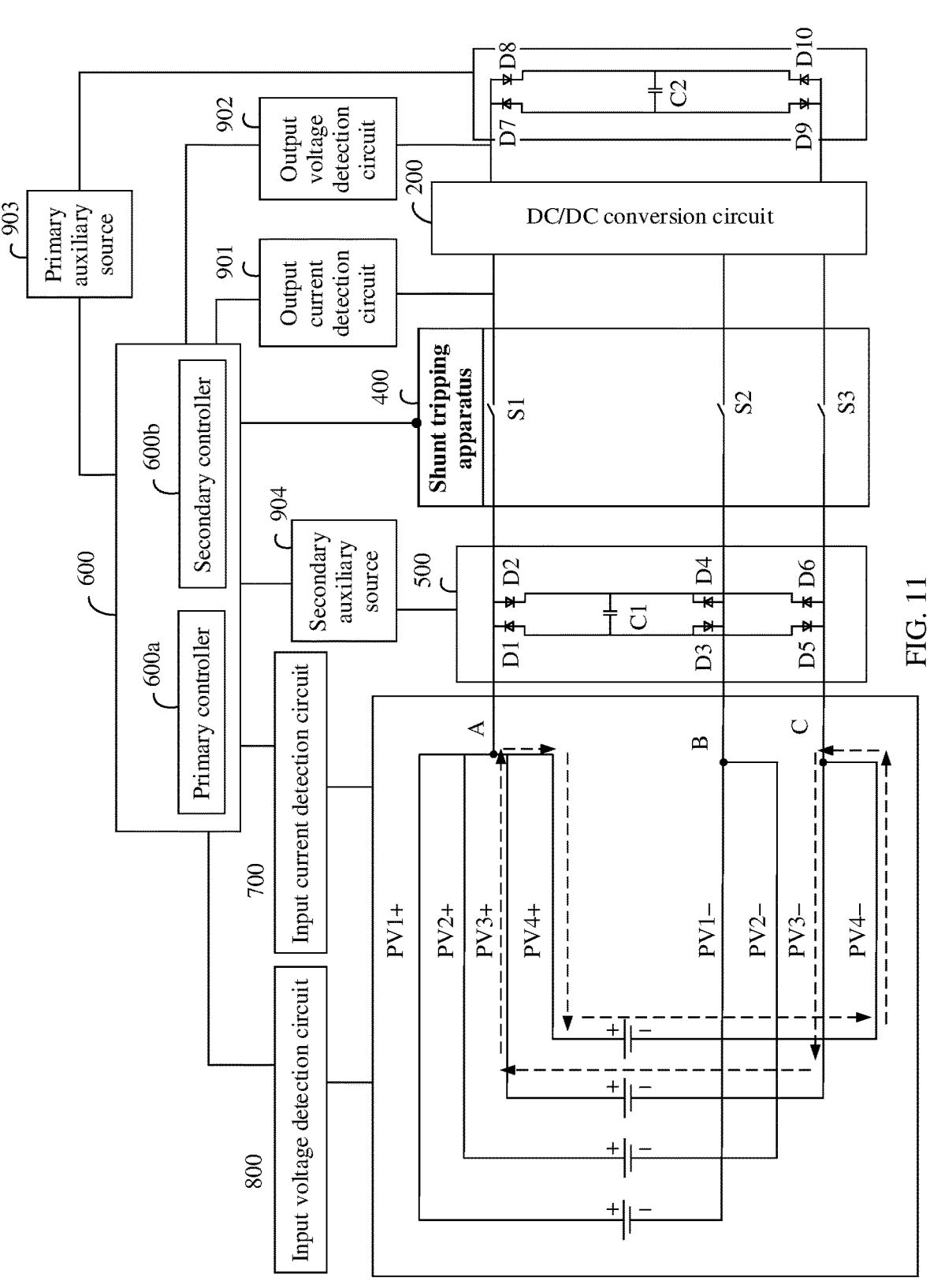
Figure 12:
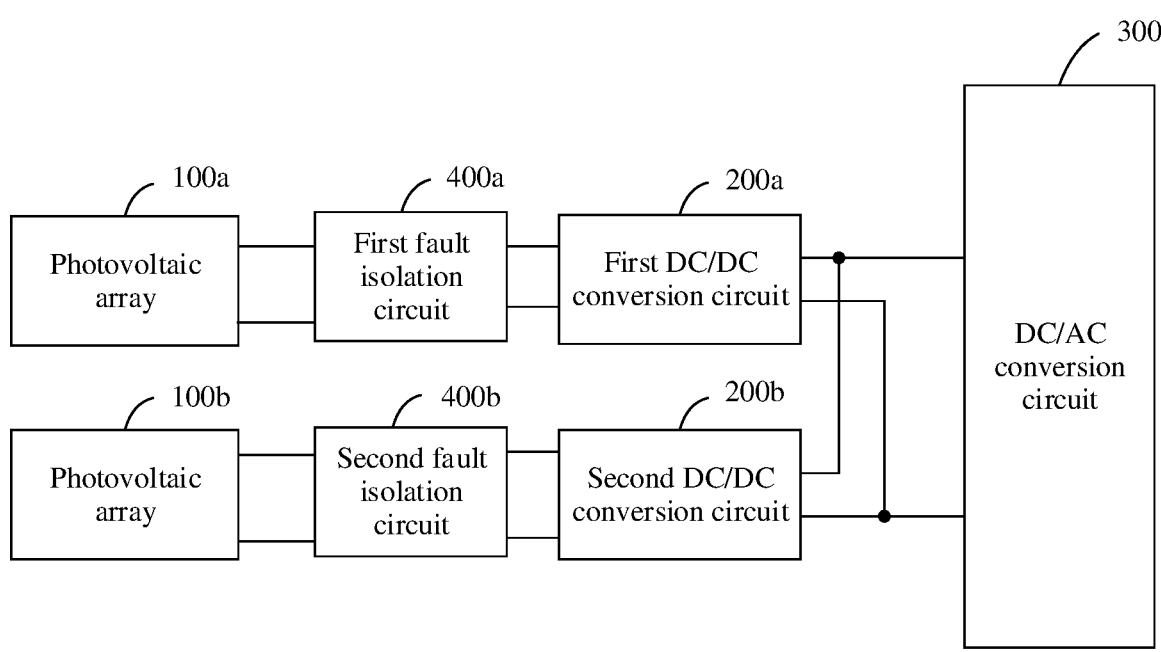
Figure 13:
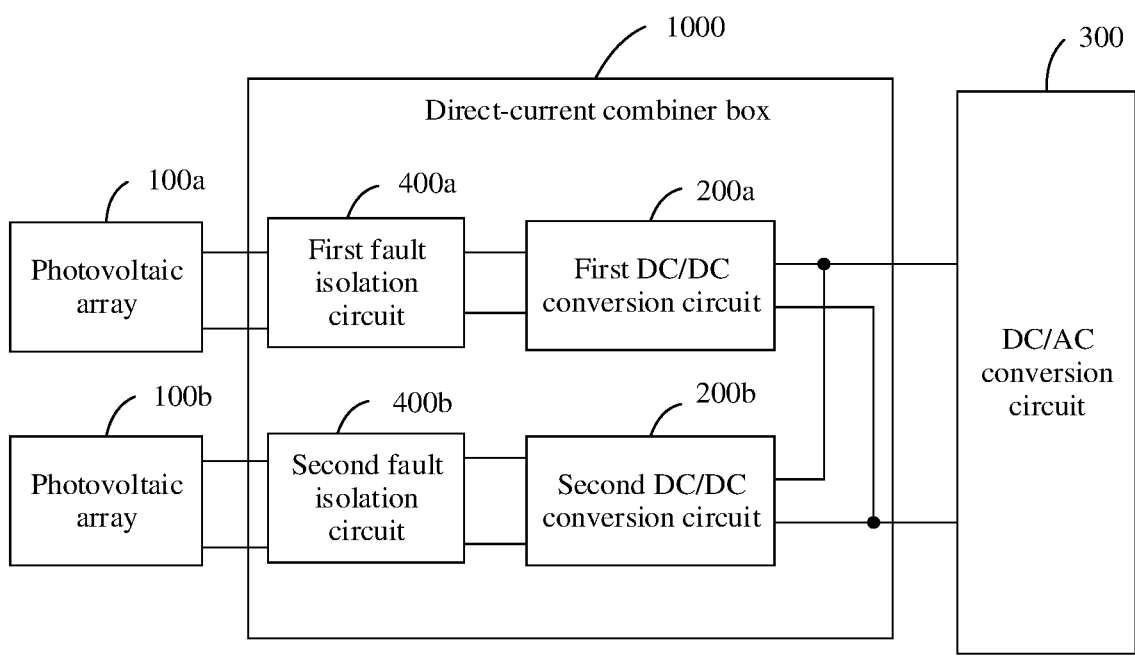
Figure 14:
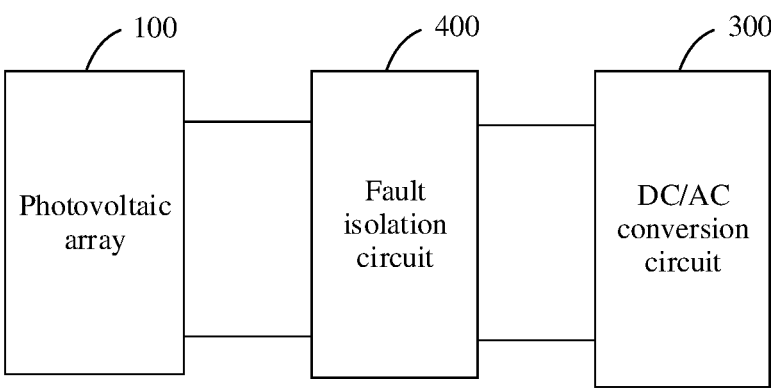

FIG. B is a schematic diagram of another photovoltaic system according to an embodiment of this application;

FIG. 2 is a schematic diagram of still another photovoltaic system according to an embodiment of this application;

FIG. 3 is a schematic diagram of a plurality of photovoltaic strings connected to an input end of a DC/DC conversion circuit in parallel;

FIG. 4 is a schematic diagram of a photovoltaic system with a fault isolation circuit according to an embodiment of this application;

FIG. 5 is a circuit diagram corresponding to FIG. 4;

FIG. 6 is a schematic diagram of a photovoltaic system corresponding to a case in which N is an even number according to an embodiment of this application;

FIG. 7 is a schematic diagram of a photovoltaic system corresponding to a case in which N is an odd number according to an embodiment of this application;

FIG. 8 is a schematic diagram of a photovoltaic system with a shunt tripping apparatus according to an embodiment of this application;

FIG. 9 is a schematic diagram of yet another photovoltaic system according to an embodiment of this application;

FIG. 10 is a schematic diagram of still yet another photovoltaic system according to an embodiment of this application;

FIG. 11 is a schematic diagram of a further photovoltaic system according to an embodiment of this application;

FIG. 12 is a schematic diagram of a photovoltaic system including a plurality of DC/DC conversion circuits according to this application;

FIG. 13 is a schematic diagram of a direct-current combiner box according to this application; and FIG. 14 is a schematic diagram of a still further photovoltaic system according to an embodiment of this application.

DETAILED DESCRIPTION OF ILLUSTRATIVE EMBODIMENTS

The following descriptions, terms such as "first" and "second" are merely intended for a purpose of description, and shall not be understood as an indication or implication of relative importance or an implicit indication of a quantity of indicated technical features. Therefore, a feature limited by "first", "second", or the like may explicitly or implicitly include one or more features. In the descriptions of this application, unless otherwise stated, "a plurality of" means two or more than two.

In addition, in this application, orientation terms such as "up" and "down" may include but are not limited to being defined relative to placement orientations of components shown in the accompanying drawings. It should be understood that these directional terms may be relative concepts and are used for relative description and clarification, and may vary correspondingly based on changes of the placement orientations of the components in the accompanying drawings.

In this application, unless otherwise specified and limited, the term "connection" should be understood in a broad sense. For example, the "connection" may be a fixed connection, a detachable connection, an integration, a direct connection, or an indirect connection through an intermediate medium. In addition, a term "coupling" may be a manner of implementing an electrical connection for signal transmission. The "coupling" may be a direct electrical connection, or may be an indirect electrical connection through an intermediate medium.

Photovoltaic System Embodiment

Embodiments of this application relate to a photovoltaic system. The photovoltaic system may include two-stage power conversion or single-stage power conversion. The following first describes a photovoltaic system including two stages of power conversion circuits. To enable persons skilled in the art to better understand technical solutions provided in embodiments of this application, the following describes the photovoltaic system provided in embodiments of this application with reference to accompanying drawings.

Figure 1A:
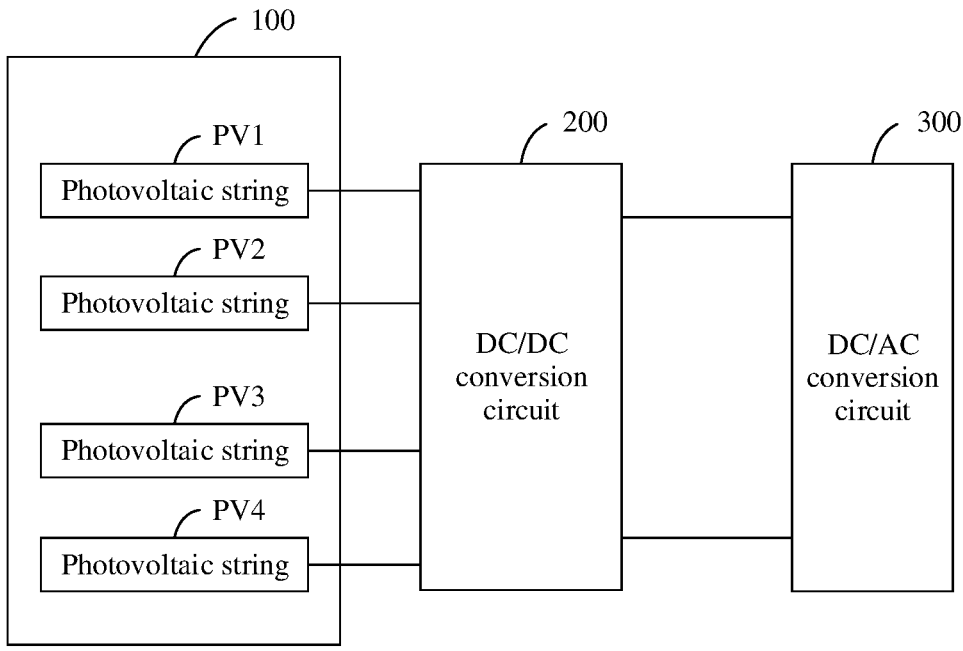
FIG. 1A is a schematic diagram of a photovoltaic system according to an embodiment of this application.

FIG. 1A is a schematic diagram of a photovoltaic system according to an embodiment of this application.

The photovoltaic system provided in this embodiment of this application includes a DC/DC conversion circuit 200 and a DC/AC conversion circuit 300, where a plurality of photovoltaic strings are connected to an input end of the DC/DC conversion circuit 200. A photovoltaic array 100 is connected to the input end of the DC/DC conversion circuit 200, and the photovoltaic array 100 includes a plurality of photovoltaic strings. In FIG. 1A, four photovoltaic strings are used as an example for description: a photovoltaic string PV1 to a photovoltaic string PV4. The photovoltaic string PV1 to the photovoltaic string PV4 may be connected to the input end of the DC/DC conversion circuit 200 in parallel, to increase an input current of the DC/DC conversion circuit 200. An output end of the DC/DC conversion circuit 200 is connected to the DC/AC conversion circuit 300.

The DC/DC conversion circuit 200 is configured to perform direct current-to-direct current conversion, and the DC/AC conversion circuit 300 performs direct current-to-alternating current conversion. An output end of the DC/AC conversion circuit 300 may be connected to a transformer, that is, connected to a power grid through the transformer.

In addition, FIG. 1A is only a schematic diagram of one DC/DC conversion circuit 200 connected to the DC/AC conversion circuit 300. Usually, to increase output power of the DC/AC conversion circuit 300, a plurality of DC/DC conversion circuits 200 may be connected to an input end of the DC/AC conversion circuit 300.

Figure 1B:
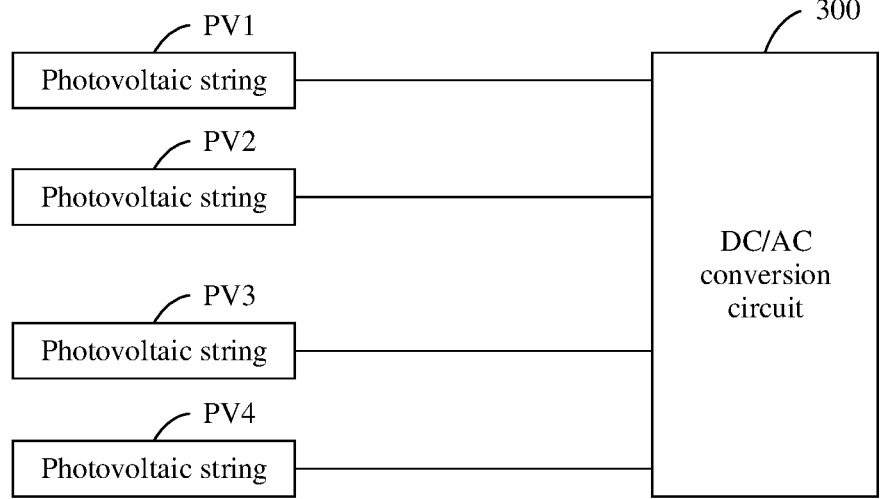

It should be understood that a power conversion circuit in the photovoltaic system shown in FIG. 1A includes the DC/DC conversion circuit 200 and the DC/AC conversion circuit 300. Alternatively, a power conversion circuit in a photovoltaic system provided in an embodiment of this application may include only a DC/AC conversion circuit, and does not include a DC/DC conversion circuit. FIG. 1B is a schematic diagram of another photovoltaic system according to an embodiment of this application.

It can be learned through comparison between FIG. 1A and FIG. 1B that a photovoltaic string PV1 to a photovoltaic string PV4 in FIG. 1B are directly connected to an input end of a DC/AC conversion circuit 300. A specific implementation form of the power conversion circuit is not limited in technical solutions provided in the following embodiments of this application. To be specific, the power conversion circuit may include the DC/DC conversion circuit 200 and the DC/AC conversion circuit 300, as shown in FIG. 1A; or the power conversion circuit may include only the DC/AC conversion circuit 300, as shown in FIG. B. An example in which the power conversion circuit includes a DC/DC conversion circuit is mainly used below for description.

FIG. 2 is a schematic diagram of still another photovoltaic system according to an embodiment of this application.

In FIG. 2, an example in which output ends of two DC/DC conversion circuits are both connected to a DC/AC conversion circuit 300 is used for description. To be specific, an output end of a first DC/DC conversion circuit 200a and an output end of a second DC/DC conversion circuit 200b are connected in parallel and are connected to an input end of the DC/AC conversion circuit 300. The first DC/DC conversion circuit 200a and the second DC/DC conversion circuit 200b may be integrated in a direct-current combiner box 1000. The direct-current combiner box 1000 may have a maximum power point tracking function.

In FIG. 2, for example, an input end of the first DC/DC conversion circuit 200a is connected to a photovoltaic string PV1 and a photovoltaic string PV2, and an input end of the second DC/DC conversion circuit 200b is connected to a photovoltaic string PV3 and a photovoltaic string PV4.

In the photovoltaic system shown in FIG. 1 or FIG. 2, a plurality of photovoltaic strings are connected to the input end of the DC/DC conversion circuit, the plurality of photovoltaic strings are usually connected in parallel, and when one of the photovoltaic strings is reversely connected, that is, a positive electrode and a negative electrode are reversed, currents of other photovoltaic strings backflow to the reversely connected photovoltaic string. Because an antiparallel diode in the photovoltaic string can carry a limited current, when currents of a plurality of photovoltaic strings backflow to one photovoltaic string, a battery in the photovoltaic string is damaged.

FIG. 3 is a schematic diagram of a plurality of photovoltaic groups connected to an input end of a DC/DC conversion circuit in parallel.

Four photovoltaic strings are still used as an example for description. In FIG. 3, the photovoltaic strings are equivalent to a battery. In a conventional manner, a positive electrode PV1+ to a positive electrode PV4+ of the four photovoltaic strings are connected together and then connected to a positive input end of a DC/DC conversion circuit 200, and a negative electrode PV1− to a negative electrode PV4− of the four photovoltaic strings are connected together and then connected to a negative input end of the DC/DC conversion circuit 200. For example, when a PV4 is reversely connected, that is, a positive electrode and a negative electrode are reversed, it can be learned that positive electrodes of a PV1 to a PV3 are connected to the positive input end of the DC/DC conversion circuit 200, a positive electrode of the PV4 is connected to the negative input end of the DC/DC conversion circuit 200. FIG. 3 shows a case in which the photovoltaic string PV4 is reversely connected. It can be learned from FIG. 3 that currents of the PV1 to the PV3 are represented by dashed lines with arrows, and a current of the PV4 is represented by solid lines with arrows, that is, the currents of the PV1 to the PV3 backflow to the PV4. The PV4 is damaged due to an excessively large current. In addition, in FIG. 3, a fuse is added to each photovoltaic string. To be specific, fuses F1 to F4 are connected in series to the four photovoltaic strings respectively. The fuses increase circuit loss. In addition, to disconnect a fuse, an input current needs to be twice of a rated current of the fuse, and reliability is low.

To resolve the foregoing problems caused by reverse connection of a photovoltaic string, an embodiment of this application provides a photovoltaic system. The photovoltaic system includes a fault isolation circuit. The fault isolation circuit includes a multipole switch. A quantity of poles of switches depends on a quantity of photovoltaic strings. For example, N photovoltaic strings are divided into a plurality of groups, each group of photovoltaic strings includes at least two photovoltaic strings, and each group of photovoltaic strings is connected to an input end of a power conversion circuit through one pole of switch in the multipole switch. When a reverse connection fault occurs in the N photovoltaic strings, that is, provided that a reverse connection fault occurs in one photovoltaic string, all photovoltaic strings connected to a same power conversion circuit are disconnected from the power conversion circuit. That is, the entire multipole switch is turned off in linkage, and the N photovoltaic strings are disconnected from the power conversion circuit.

In the photovoltaic system provided in this embodiment of this application, the fault isolation circuit includes the multipole switch, that is, the multipole switch includes a plurality of Ps. The multi-P switch can act in linkage. Provided that a reverse connection fault occurs in one or more photovoltaic strings connected to the multipole switch, all poles of the multipole switch are turned off. Each group of photovoltaic strings corresponds to one pole of switch, and each group of photovoltaic strings includes at least two photovoltaic strings. Therefore, a quantity of poles of switches is nearly half of a quantity of photovoltaic strings. This greatly reduces a quantity of switches, simplifies circuit connections, and reduces hardware costs of the fault isolation circuit. Because the multipole switch can operate in linkage, when a reverse connection fault occurs in one or more photovoltaic strings, all photovoltaic strings can be reliably disconnected from the power conversion circuit, to protect the photovoltaic strings and the power conversion circuit.

In a possible implementation, when positive electrodes of the N photovoltaic strings are connected, the positive electrodes of the N photovoltaic strings are connected together, and the positive electrodes of the N photovoltaic strings are connected to the input end of the power conversion circuit through one pole of switch in the multipole switch. In a possible implementation, every two of the N photovoltaic strings may form a group, to better protect each photovoltaic string and avoid a case in which an excessively large quantity of photovoltaic strings are connected in parallel and when one photovoltaic string is reversely connected, other photovoltaic strings connected in parallel are damaged due to an excessively large current. Because the positive electrodes of the N photovoltaic strings are connected, every two of negative electrodes of the N photovoltaic strings form a group, negative electrodes of each group of photovoltaic strings are connected to the input end of the power conversion circuit through one pole of switch in the multipole switch.

The foregoing describes a case in which the positive electrodes of the N photovoltaic strings are connected. Alternatively, the negative electrodes of the N photovoltaic strings may be connected. The following specifically describes a connection mode in which the negative electrodes of the N photovoltaic strings are connected.

When the negative electrodes of the N photovoltaic strings are connected, the negative electrodes of the N photovoltaic strings are connected together, the negative electrodes of the N photovoltaic strings are connected to the input end of the power conversion circuit through one pole of switch in the multipole switch. Similar to the case in which the positive electrodes of the N photovoltaic strings are connected, every two of the N photovoltaic strings form a group. To be specific, every two of the positive electrodes of the N photovoltaic strings form a group and share one pole of switch, and positive electrodes of each group of photovoltaic strings are connected to the input end of the power conversion circuit through one pole of switch in the multipole switch.

For example, the N photovoltaic strings are divided into M groups, and one pole of switch is required for connecting each group of photovoltaic strings to the power conversion circuit, that is, M poles of switches are required. In addition, an end at which the positive electrodes or the negative electrodes of the N photovoltaic strings are connected is connected to the power conversion circuit through one pole of switch. Therefore, the fault isolation circuit includes an (M+1)-pole switch. A relationship between M and N includes two cases depending on whether N is an odd number or an even number: When N is an even number, M=N/2; or when N is an odd number, M=(N+1)/2. First ends of the N photovoltaic strings are all connected to the input end of the power conversion circuit through a first pole of switch in the (M+1)-pole switch The M groups of photovoltaic strings are connected to the input end of the power conversion circuit through the M poles of switches in the (M+1)-pole switch respectively. When a reverse connection fault occurs in the N photovoltaic strings, the entire (M+1)-pole switch is turned off. To be specific, provided that a reverse connection fault occurs in one of the photovoltaic strings, all poles of switches in the fault isolation circuit are turned off. Because every two photovoltaic strings form a group, two photovoltaic strings are connected in parallel, and are connected to the input end of the power conversion circuit through one pole of switch. When N is an odd number, a photovoltaic string left after grouping forms a group alone. When one of the photovoltaic strings is reversely connected, a current of only one photovoltaic string backflows. The current is small, and therefore does not damage the reversely connected photovoltaic string.

In this embodiment of this application, whether the first ends of the photovoltaic strings are the positive electrodes or the negative electrodes is not limited. To be specific, either the positive electrodes or the negative electrodes of the N photovoltaic strings may be connected. For ease of description, an example in which the positive electrodes of the N photovoltaic strings are connected is used for description in the following embodiments. When the positive electrodes of the N photovoltaic strings are connected, the positive electrodes of the N photovoltaic strings are connected together, and are connected to a positive input end of the power conversion circuit through one pole of switch. Every two of the negative electrodes of the N photovoltaic strings form a group, and each group is connected to a negative input end of the power conversion circuit through a corresponding pole of switch. Because the positive electrodes of the N photovoltaic strings are connected together, an input current of the power conversion circuit can be increased. In addition, because every two of the negative electrodes of the N photovoltaic strings form a group, a quantity of poles of switches in the fault isolation circuit is reduced to some extent, so that complexity of a hardware structure is reduced, and costs are reduced.

For ease of understanding, first, an example in which N is an even number is used for description in the following embodiments of this application. An example in which the power conversion circuit includes a DC/DC conversion circuit is used. With reference to FIG. 4 and FIG. 5, an example in which four photovoltaic strings are connected to an input end of one DC/DC conversion circuit is still used for description.

FIG. 4 is a schematic diagram of a photovoltaic system with a fault isolation circuit according to an embodiment of this application.

FIG. 5 is a circuit diagram corresponding to FIG. 4.

It can be learned from FIG. 4 that four photovoltaic strings are connected to a first end of a fault isolation circuit 400, a second end of the fault isolation circuit 400 is connected to an input end of a DC/DC conversion circuit 200, and an output end of the DC/DC conversion circuit 200 is connected to an input end of a DC/AC conversion circuit 300. Positive electrodes of the four photovoltaic strings are connected together, that is, positive electrodes PV1+ to PV4+ are connected together. The four photovoltaic strings are divided into two groups, and two photovoltaic strings form a group. To be specific, negative electrodes of every two photovoltaic strings are connected together, a PV1− and a PV2− are connected together, and a PV3− and a PV4− are connected together.

Provided that a reverse connection fault occurs in one of the four photovoltaic strings, all switches in the fault isolation circuit 400 are turned off, to be specific, all photovoltaic strings are disconnected from the input end of the DC/DC conversion circuit 200, to prevent the fault from affecting another circuit.

An example in which a photovoltaic string PV4 is reversely connected is still used. Because the PV1− and the PV2− are not connected to the PV4−, when the PV4 is reversely connected, only a current of a PV3 backflows to the PV4. Therefore, the current backflowing to the PV4 is small, and does not damage the PV4. This is different from the case in FIG. 3.

To describe a connection relationship between the photovoltaic strings and the switches in the fault isolation circuit 400 more clearly, the following continues to describe an operation principle with reference to FIG. 5.

Because N is 4 and N is an even number, M=4/2. To be specific, the photovoltaic strings are divided into two groups. Correspondingly, the fault isolation circuit 400 includes an (M+1)-pole switch, namely, 2+1=3 poles of switches: a first pole of switch S1, a second pole of switch S2, and a third pole of switch S3.

Positive electrodes PV1+ to PV4+ are connected together, and are connected to a first end of the first pole of switch S1, and a second end of the first pole of switch S1 is connected to an input end of a DC/DC conversion circuit 200. A PV1− and a PV2− are connected together, and are connected to a first end of the second pole of switch S2, and a second end of the second pole of switch S2 is connected to the input end of the DC/DC conversion circuit 200. A PV3− and a PV4− are connected together, and are connected to a first end of the third pole of switch S3, and a second end of the third pole of switch S3 is connected to the input end of the DC/DC conversion circuit 200.

When a PV4 is reversely connected, the first pole of switch S1, the second pole of switch S2, and the third pole of switch S3 are all turned off.

Clearly, in the photovoltaic system provided in this embodiment of this application, when a photovoltaic string is reversely connected, all switches in the fault isolation circuit may be turned off, so as to disconnect the photovoltaic string from a next-stage DC/DC conversion circuit, and prevent the reverse connection fault from causing another more serious fault. In addition, in the fault isolation circuit provided in this embodiment of this application, every two photovoltaic strings can form a group for connection. To be specific, a maximum of two photovoltaic strings are connected to a separate pole of switch. This prevents more photovoltaic strings from being connected together, and avoids the following problem: When a reverse connection fault occurs in one photovoltaic string, currents of all other photovoltaic strings that are connected together backflow to the photovoltaic string, causing damage to the photovoltaic string. In this embodiment of this application, two photovoltaic strings are connected in parallel. Even if a reverse connection fault occurs, a backflow current is small, and does not damage the photovoltaic strings. It should be understood that, that a reverse connection fault occurs in a photovoltaic string in all embodiments of this application means that at least one photovoltaic string is reversely connected. To be specific, provided that one photovoltaic string is reversely connected, the N photovoltaic strings need to be disconnected from the power conversion circuit.

In the photovoltaic system provided in this embodiment of this application, to protect photovoltaic strings, every two photovoltaic strings, rather than more photovoltaic strings, form a group and are connected to one pole of switch. If more photovoltaic strings are connected in parallel, a magnitude of a backflow current cannot be ensured when a reverse connection occurs. Because many photovoltaic strings are connected in parallel, the backflow current increases, and damages the photovoltaic strings. In this embodiment of this application, when a reverse connection occurs, safety of photovoltaic strings is ensured while a quantity of switches in the fault isolation circuit is reduced as far as possible, so as to achieve a balance between safety and the quantity of switches.

In the foregoing embodiment, an implementation in which four photovoltaic strings are included is described. Technical solutions provided in embodiments of this application are applicable to a case in which N is an even number and has a larger value. For example, the following describes an implementation in which N=6, to be specific, six photovoltaic strings are included.

FIG. 6 is a schematic diagram of a photovoltaic system corresponding to a case in which N is an even number according to an embodiment of this application.

Because N=6, photovoltaic strings are divided into M=6/2=3 groups, and a fault isolation circuit 400 includes M+1=4 poles of switches: a first pole of switch S1, a second pole of switch S2, a third pole of switch S3, and a fourth pole of switch S4.

Positive electrodes PV1+ to PV6+ of the six photovoltaic strings are connected together, and are connected to a first end of the first pole of switch S1. Every two photovoltaic strings form a group. Negative electrodes of every two photovoltaic strings correspond to one pole of switch. A PV1− and a PV2− are connected to a first end of the second pole of switch S2. A PV3− and a PV4− are connected to a first end of the third pole of switch S3. A PV5− and a PV6− are connected to a first end of the fourth pole of switch S4. A second end of the first pole of switch S1, a second end of the second pole of switch S2, a second end of the third pole of switch S3, and a second end of the fourth pole of switch S4 are all connected to a DC/DC conversion circuit 200.

The foregoing describes an implementation in which N is an even number. The following describes an implementation in which N is an odd number with reference to accompanying drawings.

FIG. 7 is a schematic diagram of a photovoltaic system corresponding to a case in which N is an odd number according to an embodiment of this application.

For ease of description, an example in which N=5 is used for description. Therefore, five photovoltaic strings are divided into M=(N+1)/2=3 groups, and a fault isolation circuit 400 includes M+1=4 poles of switches: a first pole of switch S1, a second pole of switch S2, a third pole of switch S3, and a fourth pole of switch S4. That is, a quantity of poles of switches is the same as that in the case in which N is 6.

Because every two photovoltaic strings form a group and N is an odd number, a last remaining photovoltaic string cannot be paired. Therefore, the remaining photovoltaic string forms a group alone, and corresponds to one pole of switch in the fault isolation circuit 400.

Positive electrodes PV1+ to PV5+ of the five photovoltaic strings are connected together, and are connected to a first end of the first pole of switch S1. Every two photovoltaic strings form a group. Negative electrodes of every two photovoltaic strings correspond to one pole of switch. A PV1− and a PV2− are connected to a first end of the second pole of switch S2. A PV3− and a PV4− are connected to a first end of the third pole of switch S3. A PV5− forms a group alone, and is connected to a first end of the fourth pole of switch S4. A second end of the first pole of switch S1, a second end of the second pole of switch S2, a second end of the third pole of switch S3, and a second end of the fourth pole of switch S4 are all connected to a DC/DC conversion circuit 200.

An example in which N is an even number and an example in which N is an odd number are used above for description. An example in which N is an even number, that is, N is 4, is still used below to describe other implementations.

To reliably turn off a switch in a fault isolation circuit when a reverse connection fault occurs in a photovoltaic string, the fault isolation circuit provided in this embodiment of this application may further include a shunt tripping apparatus. Descriptions are provided below with reference to accompanying drawings.

FIG. 8 is a schematic diagram of a photovoltaic system with a shunt tripping apparatus according to an embodiment of this application.

In the photovoltaic system provided in this embodiment, a fault isolation circuit further includes a shunt tripping apparatus and a controller 600.

The controller 600 is configured to: when a reverse connection fault occurs in N photovoltaic strings, send a disconnection instruction to the shunt tripping apparatus. The shunt tripping apparatus acts according to the disconnection instruction and drives an entire (M+1)-pole switch to be turned off. The entire (M+1)-pole switch remains in an off state before the shunt tripping apparatus is reset.

An example in which a reverse connection fault occurs in a PV4 is still used. The controller 600 sends a disconnection instruction to the shunt tripping apparatus. The shunt tripping apparatus acts to drive all three poles of switches S1 to S3 to be turned off. If the shunt tripping apparatus is not actively reset, the three poles of switches S1 to S3 remain in off states. This prevents the three poles of switches S1 to S3 from being turned on before the fault of the photovoltaic string is rectified, so that the photovoltaic string can be better protected.

In addition, the controller 600 provided in this embodiment of this application needs to obtain power from a power supply, and therefore may include a first power obtaining circuit 500. The first power obtaining circuit 500 provided in this embodiment of this application obtains power through contention. To be specific, the first power obtaining circuit 500 is configured to obtain power from a group of photovoltaic strings with a highest voltage in M groups of photovoltaic strings to supply power to the controller 600, without obtaining power from each group of photovoltaic strings.

FIG. 8 shows an implementation of obtaining power through contention, that is, an implementation circuit of a first power obtaining circuit. The first power obtaining circuit includes 2×(M+1) diodes and a first capacitor. Because N is 4, M is 2, and the first power obtaining circuit includes six diodes and one capacitor.

Each pole of switch in the (M+1)-pole switch corresponds to two of the 2×(M+1) diodes. A first end of each pole of switch in the (M+1)-pole switch is connected to a first end and a second end of the first capacitor through a forward bias diode and a reverse bias diode respectively. The first end of each pole of switch in the (M+1)-pole switch is connected to a corresponding photovoltaic string. A second end of each pole of switch in the (M+1)-pole switch is connected to an input end of a DC/DC conversion circuit.

It can be learned from FIG. 8 that the fault isolation circuit includes the three poles of switches S1 to S3, and each pole of switch corresponds to two diodes. To be specific, a first end of the first pole of switch S1 is connected to two ends of the first capacitor C1 through a corresponding forward bias diode D2 and a corresponding reverse bias diode D1 respectively, a first end of the second pole of switch S2 is connected to two ends of the first capacitor C1 through a corresponding forward bias diode D4 and a corresponding reverse bias diode D3 respectively, and a first end of the third pole of switch S3 is connected to two ends of the first capacitor C1 through a corresponding forward bias diode D6 and a corresponding reverse bias diode D5 respectively. A PV1+ to a PV4+ are connected together at a point A. A cathode of the D1 is connected to the point A. Similarly, an anode of the D2 is connected to the point A. A PV1− and a PV2− are connected together at a point B. A cathode of the D3 is connected to the point B. Similarly, an anode of the D4 is connected to the point B. A PV3− and a PV4− are connected together at a point C. A cathode of the D5 is connected to the point C. Similarly, an anode of the D6 is connected to the point C.

The following describes a specific operation principle of contention-based power supply by using an example with reference to the accompanying drawing.

For example, when a voltage of a PV1 and a PV2 connected in parallel is higher than a voltage of a PV3 and a PV4 connected in parallel, a voltage at the point B is lower than a voltage at the point C, and a current backflows to the PV1 and the PV2 through the point B. On the contrary, when a voltage of the PV1 and the PV2 connected in parallel is lower than a voltage of the PV3 and the PV4 connected in parallel, a voltage at the point B is higher than a voltage at the point C, and a current backflows to the PV3 and the PV4.

When the PV1 to the PV4 are all reversely connected, if a voltage of the PV1 and the PV2 connected in parallel is higher than a voltage of the PV3 and the PV4 connected in parallel, a voltage at the point B is higher than a voltage at the point C, and a current flows out from the PV1 and the PV2; otherwise, a current flows out from the PV3 and the PV4.

The following describes a specific implementation of determining whether a photovoltaic string is reversely connected.

FIG. 9 is a schematic diagram of yet another photovoltaic system according to an embodiment of this application.

The photovoltaic system provided in this embodiment may further include an input current detection circuit 700.

The input current detection circuit 700 is configured to detect a current of each of N photovoltaic strings. It should be understood that a current sensor may be connected to each photovoltaic string in series to detect a current of the photovoltaic string. In normal cases, current directions of all the photovoltaic strings are the same. If a reverse connection occurs, a current direction of a reversely connected photovoltaic string is opposite to that of another normal photovoltaic string. Therefore, whether a reverse connection occurs may be determined based on a current direction. For example, in normal cases, a current is a positive value, and when a reverse connection occurs, a detected current is a negative value, and therefore it is determined that a reverse connection occurs.

A controller 600 is configured to: when it is determined, based on the current of each photovoltaic string, that a current of any one of the N photovoltaic strings is reverse, control an entire (M+1)-pole switch in a fault isolation circuit 400 to be turned off. To be specific, the controller 600 sends a disconnection instruction to a shunt tripping apparatus, and the shunt tripping apparatus drives all three poles of switches S1 to S3 to be turned off. Provided that a reverse connection fault occurs in one of all the photovoltaic strings, all the photovoltaic strings need to be disconnected from a DC/DC conversion circuit 200.

The fault isolation circuit 400 provided in this embodiment of this application not only can be disconnected for protection when a reverse connection fault occurs in a photovoltaic string, but also can be disconnected for protection when a short-circuit fault occurs in a photovoltaic string. Details are described below.

In addition to the input current detection circuit 700, the photovoltaic system provided in this embodiment may further include an input voltage detection circuit 800.

The input voltage detection circuit 800 is configured to detect a voltage between a first end of the first pole of switch S1 and a first end of each of M poles of switches (the S2 and the S3), to obtain M voltages. To be specific, a voltage detected by the input voltage detection circuit 800 is a voltage of each group of photovoltaic strings in the M groups of photovoltaic strings. Provided that a voltage of a group of photovoltaic strings is low, a short-circuit fault may have occurred in a photovoltaic string. It should be understood that, when the short-circuit fault occurs, a voltage of the photovoltaic string decreases, and a current increases. To accurately identify a short-circuit fault, determining may be performed based on both a voltage and a current. As shown in FIG. 9, the input voltage detection circuit 800 needs to detect a voltage between a point A at which a PV1+ to a PV4+ are connected together and a point B at which a PV1− and a PV2− are connected together, and the input voltage detection circuit 800 further needs to detect a voltage between the point A at which the PV1+ to the PV4+ are connected and a point C at which a PV3− and a PV4− are connected together.

In a specific implementation, the controller 600 is configured to: when at least one of the M voltages is less than a first voltage threshold and a current of at least one of the N photovoltaic strings is greater than a first current threshold, control the entire (M+1)-pole switch to be turned off. To be specific, provided that a short-circuit fault occurs in a photovoltaic string, all switches in the fault isolation circuit 400 are turned off, to isolate the faulty photovoltaic string and prevent a next-stage circuit from being damaged due to the short-circuit fault.

In the foregoing embodiment, how to detect a short-circuit fault at an input end of a DC/DC conversion circuit is described. The following describes a short-circuit fault at an output end of a DC/DC conversion circuit.

FIG. 10 is a schematic diagram of still yet another photovoltaic system according to an embodiment of this application.

In this embodiment of this application, whether a short-circuit fault occurs at an input end of a DC/DC conversion circuit can be detected, and whether a short-circuit fault occurs at an output end of the DC/DC conversion circuit can also be detected. When a short-circuit fault occurs at the output end of the DC/DC conversion circuit, to prevent extension of a fault range and implement protection, all poles of switches in a fault isolation circuit also need to be controlled to be turned off, to implement fault isolation.

The photovoltaic system provided in this embodiment further includes an output voltage detection circuit 901 and an output current detection circuit 902.

The output voltage detection circuit 901 is configured to detect an output voltage of the DC/DC conversion circuit 200.

The output current detection circuit 902 is configured to detect a current at a second end of a first pole of switch S1, that is, detect an input current of the DC/DC conversion circuit 200.

To accurately determine whether a short-circuit fault occurs at the output end of the DC/DC conversion circuit 200, determining also needs to be performed based on both a voltage and a current. When both the voltage and the current meet corresponding determining conditions, it is determined that a short-circuit fault occurs. To be specific, a controller 600 is configured to: when the current at the second end of the first pole of switch S1 is greater than a second current threshold and a voltage at the output end of the DC/DC conversion circuit 200 is lower than a second preset voltage, control an entire (M+1)-pole switch to be turned off. Because the first pole of switch S1 is connected to all photovoltaic strings, the output current detection circuit 902 needs to detect only a current flowing through the first pole of switch S1.

It should be understood that both the input current detection circuit and the output current detection circuit may be implemented by using current sensors. When a photovoltaic string is reversely connected, a current direction of the photovoltaic string is opposite to that of a normal photovoltaic string. Therefore, whether a reverse connection fault occurs may be determined by detecting a current direction. For example, when a current of the normal photovoltaic string is positive, a current of the reversely connected photovoltaic string is negative, that is, is less than zero. In this case, it is determined that the current is reverse. Alternatively, when the current is less than a preset threshold, it may be considered that the current is reverse and a reverse connection fault occurs. A current sensor may be disposed in each photovoltaic string to detect a current of the photovoltaic string. In addition, for example, four photovoltaic strings are included, current sensors may be disposed in three of the photovoltaic strings, and a current sensor is disposed for an output current. In this case, a current of another photovoltaic string may be obtained by subtracting a sum of currents of the three photovoltaic strings from the output current. In this way, one current sensor may be omitted.

In the photovoltaic system provided in this embodiment of this application, to more comprehensively ensure safe and reliable operation of the photovoltaic system, all the poles of switches in the fault isolation circuit 400 can be turned off when a reverse connection fault occurs in a photovoltaic string, all the poles of switches in the fault isolation circuit 400 can be turned off when a short-circuit fault occurs in a photovoltaic string, and all the poles of switches in the fault isolation circuit 400 can be turned off when a short-circuit fault occurs at the output end of the DC/DC conversion circuit 200, to prevent the short-circuit fault at the output end of the DC/DC conversion circuit 200 from causing damage to the photovoltaic strings.

In the foregoing embodiment, a case in which power is obtained from the photovoltaic string to supply power to the controller is described. To ensure that the controller can continue to operate when the photovoltaic string is disconnected or the photovoltaic string has no power output, an embodiment of this application further includes another power obtaining manner that may serve as a main power supply manner for the controller. The following provides detailed descriptions with reference to accompanying drawings.

FIG. 11 is a schematic diagram of a further photovoltaic system according to an embodiment of this application.

Because any hardware may be faulty during operation, to ensure secure and reliable operation of the photovoltaic system, two controllers may be disposed in the photovoltaic system to provide a backup, that is, implement redundancy control. When one of the controllers fails, normal control operation is not affected. To be specific, in the photovoltaic system provided in this embodiment, a controller 600 includes a primary controller 600a and a secondary controller 600b.

Both the primary controller 600a and the secondary controller 600b are configured to: when a reverse connection fault occurs in N photovoltaic strings, control an entire (M+1)-pole switch to be turned off. To be specific, in this embodiment of this application, the primary controller 600a and the secondary controller 600b operate simultaneously, and the primary controller 600a and the secondary controller 600b may simultaneously receive detection signals sent by an input voltage detection circuit 800, an input current detection circuit 700, an output voltage detection circuit 901, and an output current detection circuit 902, that is, the two controllers may simultaneously receive an input voltage, an input current, an output current, and an output voltage, and may determine, based on the received signals, whether to control all poles of switches in a fault isolation circuit 400 to be turned off. In this way, it can be ensured that, when one controller is faulty and cannot accurately send a disconnect instruction to the fault isolation circuit, the other normal controller can accurately and reliably control all the poles of switches to be turned off.

In addition, to ensure reliability of power supply, this embodiment of this application provides two auxiliary sources: a primary auxiliary source 903 and a secondary auxiliary source 904.

Both the primary auxiliary source 903 and the secondary auxiliary source 904 are configured to supply power to the primary controller 600a and the secondary controller 600b.

The primary auxiliary source 903 is connected to an output end of a DC/DC conversion circuit 200, that is, the primary auxiliary source 903 obtains power from the output end of the DC/DC conversion circuit 200.

The secondary auxiliary source 904 is connected to a first end of the fault isolation circuit 400, that is, the secondary auxiliary source 904 obtains power from the photovoltaic strings.

The photovoltaic system provided in this embodiment of this application includes the two auxiliary sources. Therefore, when one of the auxiliary sources fails, the other normal auxiliary source can normally supply power to the controller, to ensure normal operation of the controller.

The following describes a second power obtaining circuit that provides a power source for the primary auxiliary source 903.

The second power obtaining circuit includes a first diode D7, a second diode D8, a third diode D9, a fourth diode D10, and a second capacitor C2.

A cathode and an anode of the first diode D7 are connected to a positive output end of the DC/DC conversion circuit 200 and a first end of the second capacitor C2 respectively. An anode and a cathode of the second diode D8 are connected to the positive output end of the DC/DC conversion circuit 200 and a second end of the second capacitor C2 respectively.

An anode and a cathode of the third diode D9 are connected to the first end of the second capacitor C2 and a negative output end of the DC/DC conversion circuit 200 respectively. An anode and a cathode of the fourth diode D10 are connected to the negative output end of the DC/DC conversion circuit 200 and the second end of the second capacitor C2 respectively.

The primary auxiliary source 903 is connected to the positive output end of the DC/DC conversion circuit 200 through the second power obtaining circuit. The primary auxiliary source 903 obtains power from the output end of the DC/DC conversion circuit 200. In addition, the photovoltaic system usually includes a plurality of DC/DC conversion circuits, and output ends of the plurality of DC/DC conversion circuits are connected in parallel. Therefore, even if all the poles of switches in the fault isolation circuit 400 are turned off to isolate all photovoltaic strings connected to an input end of the DC/DC conversion circuit 200, the output end of the DC/DC conversion circuit 200 can still provide power, which comes from another DC/DC conversion circuit connected to the DC/DC conversion circuit 200 in parallel. This can ensure power supply for the primary auxiliary source 903, and therefore ensure power supply for the controller.

In this embodiment of this application, a specific implementation form of the DC/DC conversion circuit in the foregoing photovoltaic systems is not limited. For example, the DC/DC conversion circuit may be a boost circuit with a bypass relay. When the bypass relay is turned on, the boost circuit can be bypassed, that is, a voltage does not need to be boosted, and a photovoltaic string is directly connected to a next-stage DC/AC conversion circuit through the bypass relay.

Usually, to increase output power of an inverter, a plurality of DC/DC conversion circuits are connected to an input end of the DC/AC conversion circuit.

FIG. 12 is a schematic diagram of a photovoltaic system including a plurality of DC/DC conversion circuits according to an embodiment of this application.

The photovoltaic system provided in this embodiment includes a plurality of fault isolation circuits and a plurality of DC/DC conversion circuits.

The plurality of fault isolation circuits are in a one-to-one correspondence with the plurality of DC/DC conversion circuits. To be specific, an input end of each DC/DC conversion circuit is connected to a corresponding fault isolation circuit. Output ends of the plurality of DC/DC conversion circuits are all connected to an input end of a DC/AC conversion circuit 300.

In the following descriptions, for example, at least two DC/DC conversion circuits such as a first DC/DC conversion circuit 200a and a second DC/DC conversion circuit 200b are connected to the input end of the DC/AC conversion circuit. Input ends of the first DC/DC conversion circuit 200a and the second DC/DC conversion circuit 200b are respectively connected to corresponding photovoltaic arrays. To be specific, the first DC/DC conversion circuit 200a corresponds to a photovoltaic array 100a, and the second DC/DC conversion circuit 200b corresponds to a photovoltaic array 100b. The photovoltaic array 100a and the photovoltaic array 100b each include a plurality of photovoltaic strings. For details, refer to the descriptions in the foregoing embodiments. Photovoltaic strings in the photovoltaic array are not described in detail in this embodiment. In this embodiment, a first fault isolation circuit 400a is connected between the photovoltaic array 100a and an input end of the first DC/DC conversion circuit 200a, and a second fault isolation circuit 400b is connected between the photovoltaic array 100b and an input end of the second DC/DC conversion circuit 200b. Functions of the first fault isolation circuit 400a and the second fault isolation circuit 400b are the same as those of the fault isolation circuit in the photovoltaic system described in the foregoing embodiments. Details are not described herein again.

For example, when a reverse connection fault occurs in a photovoltaic string in the photovoltaic array 100a, all switches in the first fault isolation circuit 400a are turned off, that is, the photovoltaic array 100a stops operating, and no power is supplied to the input end of the first DC/DC conversion circuit 200a. However, because photovoltaic strings in the photovoltaic array 100b are normal, operation of the DC/AC conversion circuit 300 is not affected, and the DC/AC conversion circuit 300 can normally output electric energy.

Direct-Current Combiner Box Embodiment

In addition, a photovoltaic system provided in embodiments of this application may include a combiner box, namely, a direct-current combiner box. A plurality of fault isolation circuits and a plurality of DC/DC conversion circuits are integrated in the direct-current combiner box.

The direct-current combiner box includes the plurality of fault isolation circuits and the plurality of DC/DC conversion circuits. The plurality of fault isolation circuits are in a one-to-one correspondence with the plurality of DC/DC conversion circuits. A first end of each fault isolation circuit is connected to N photovoltaic strings, and a second end of each fault isolation circuit is connected to an input end of a DC/DC conversion circuit. Each fault isolation circuit includes a multipole switch, and each group of photovoltaic strings in the N photovoltaic strings is connected to an input end of a corresponding power conversion circuit through one pole of switch in the multipole switch. Each group of photovoltaic strings includes at least two photovoltaic strings. When a reverse connection fault occurs in the N photovoltaic strings, the entire multipole switch is turned off in linkage.

Two power conversion circuits are used below as an example for description. An example in which the power conversion circuit is a DC/DC conversion circuit is used for description. The operation principles and the advantages in the foregoing photovoltaic system embodiment are also applicable to the direct-current combiner box provided in this embodiment, and same parts are not described in detail herein again.

FIG. 13 is a schematic diagram of a direct-current combiner box according to an embodiment of this application.

A first DC/DC conversion circuit 200a, a second DC/DC conversion circuit 200b, a first fault isolation circuit 400a, and a second fault isolation circuit 400b are all integrated in the direct-current combiner box 1000.

The direct-current combiner box provided in this embodiment of this application includes the fault isolation circuit, the fault isolation circuit includes a multipole switch, and the multipole switch operates in linkage, that is, is turned on or turned off as a whole. A quantity of poles of switches depends on a quantity of photovoltaic strings. If N photovoltaic strings are divided into M groups, the fault isolation circuit includes an (M+1)-pole switch. A relationship between M and N includes two cases depending on whether N is an odd number or an even number: When N is an even number, M=N/2; or when N is an odd number, M=(N+1)/2. First ends of the N photovoltaic strings are all connected to an input end of the DC/DC conversion circuit through a first pole of switch in the (M+1)-pole switch The M groups of photovoltaic strings are connected to the input end of the DC/DC conversion circuit through M poles of switches in the (M+1)-pole switch respectively. When a reverse connection fault occurs in the N photovoltaic strings, the entire (M+1)-pole switch is turned off. To be specific, provided that a reverse connection fault occurs in one of the photovoltaic strings, all poles of switches in the fault isolation circuit are turned off. Because every two photovoltaic strings form a group, two photovoltaic strings are connected in parallel, and are connected to the input end of the DC/DC conversion circuit through one pole of switch. When N is an odd number, a photovoltaic string left after grouping forms a group alone. When one of the photovoltaic strings is reversely connected, a current of only one photovoltaic string backflows. The current is small, and therefore does not damage the reversely connected photovoltaic string.

In this embodiment of this application, whether the first ends of the photovoltaic strings are positive electrodes or negative electrodes is not limited. To be specific, either the positive electrodes or the negative electrodes of the N photovoltaic strings may be connected. For ease of description, an example in which the positive electrodes of the N photovoltaic strings are connected is used for description in the following embodiments. When the positive electrodes of the N photovoltaic strings are connected, the positive electrodes of the N photovoltaic strings are connected together, and are connected to a positive input end of the DC/DC conversion circuit through one pole of switch. Every two of the negative electrodes of the N photovoltaic strings form a group, and each group is connected to a negative input end of the DC/DC conversion circuit through a corresponding pole of switch. Because the positive electrodes of the N photovoltaic strings are connected together, an input current of the DC/DC conversion circuit can be increased. In addition, because every two of the negative electrodes of the N photovoltaic strings form a group, a quantity of poles of switches in the fault isolation circuit is reduced to some extent, so that complexity of a hardware structure is reduced, and costs are reduced.

In the foregoing embodiments, an example in which a power conversion circuit includes a DC/DC conversion circuit and a DC/AC conversion circuit is used for description. The following describes an implementation in which a power conversion circuit includes only a DC/AC conversion circuit with reference to accompanying drawings.

FIG. 14 is a schematic diagram of a still further photovoltaic system according to an embodiment of this application.

The photovoltaic system provided in this embodiment includes a fault isolation circuit 400 and a DC/AC conversion circuit 300. For a specific implementation of the fault isolation circuit 400, refer to the descriptions in the foregoing embodiments. A quantity of poles of switches included in the fault isolation circuit 400 is related to a quantity of photovoltaic strings in a photovoltaic array 100 connected to the fault isolation circuit 400. When a photovoltaic string is reversely connected, all poles of switches in the fault isolation circuit 400 are turned off, that is, are turned off in linkage, so that the photovoltaic array 100 is disconnected from the DC/AC conversion circuit 300. This can protect the photovoltaic strings while preventing the reverse connection fault from causing damage to the DC/AC conversion circuit 300. In addition, the fault isolation circuit 400 can also disconnect the photovoltaic array 100 from the DC/AC conversion circuit 300 when a short-circuit fault occurs in a photovoltaic string.

Method Embodiment

Based on the photovoltaic system and the direct-current combiner box provided in the foregoing embodiments, an embodiment of this application further provides a fault isolation method.

The fault isolation method provided in this embodiment is applied to the photovoltaic system described in any one of the foregoing embodiments. The photovoltaic system includes a fault isolation circuit and a power conversion circuit. A first end of the fault isolation circuit is connected to N photovoltaic strings, and a second end of the fault isolation circuit is connected to the power conversion circuit. The fault isolation circuit includes a multipole switch, and each group of photovoltaic strings in the N photovoltaic strings is connected to an input end of the power conversion circuit through one pole of switch in the multipole switch. Each group of photovoltaic strings includes at least two photovoltaic strings.

The method includes:

determining that a reverse connection fault occurs in the N photovoltaic strings, and controlling an entire (M+1)-pole switch to be turned off.

The determining that a reverse connection fault occurs in the N photovoltaic strings specifically includes:

obtaining a current of each of the N photovoltaic strings; and determining, based on the current of each photovoltaic string, that a current of any one of the N photovoltaic strings is reverse, and determining that a reverse connection fault occurs in the N photovoltaic strings.

When a photovoltaic string is reversely connected, a current direction of the photovoltaic string is opposite to that of a normal photovoltaic string. Therefore, whether a reverse connection fault occurs may be determined by detecting a current direction. For example, when a current of the normal photovoltaic string is positive, a current of the reversely connected photovoltaic string is negative, that is, is less than zero. In this case, it is determined that the current is reverse. Alternatively, when the current is less than a preset threshold, it may be considered that the current is reverse and a reverse connection fault occurs. A current sensor may be disposed in each photovoltaic string to detect a current of the photovoltaic string. In addition, for example, four photovoltaic strings are included, current sensors may be disposed in three of the photovoltaic strings, and a current sensor is disposed for an output current. In this case, a current of another photovoltaic string may be obtained by subtracting a sum of currents of the three photovoltaic strings from the output current. In this way, one current sensor may be omitted.

To better prevent a photovoltaic string from carrying an excessively large current when the photovoltaic string is reversely connected, every two photovoltaic strings may form a group, and each group of photovoltaic strings is in a one-to-one correspondence with one pole of switch in the multipole switch.

An example in which every two of the N photovoltaic strings form a group is used for description.

Positive electrodes of the N photovoltaic strings are connected, the positive electrodes of the N photovoltaic strings are connected to the input end of the power conversion circuit through one pole of switch in the multipole switch, every two of the N photovoltaic strings form a group, and negative electrodes of each group of photovoltaic strings are connected to the input end of the power conversion circuit through one pole of switch in the multipole switch.

Alternatively, negative electrodes of the N photovoltaic strings are connected, the negative electrodes of the N photovoltaic strings are connected to the input end of the power conversion circuit through one pole of switch in the multipole switch, every two of the N photovoltaic strings form a group, and positive electrodes of each group of photovoltaic strings are connected to the input end of the power conversion circuit through one pole of switch in the multipole switch.

The N photovoltaic strings are divided into M groups. When N is an even number, M=N/2; or when N is an odd number, M=(N+1)/2. The fault isolation circuit includes an (M+1)-pole switch. The (M+1)-pole switch operates in linkage, that is, is turned on or turned off as a whole. First ends of the N photovoltaic strings are all connected to an input end of a DC/DC conversion circuit through a first pole of switch in the (M+1)-pole switch. The M groups of photovoltaic strings are connected to the input end of the DC/DC conversion circuit through M poles of switches in the (M+1)-pole switch respectively.

It should be understood that, in this application, "at least one (item)" means one or more, and "a plurality of" means two or more. The term "and/or" is used to describe an association relationship between associated objects, and represents that three relationships may exist. For example, "A and/or B" may represent the following three cases: Only A exists, only B exists, and both A and B exist, where A and B may be singular or plural. The character "/" usually indicates an "or" relationship between the associated objects. "At least one of the following" or a similar expression thereof indicates any combination of the items, including any combination of one or more of the items. For example, at least one of a, b, or c may indicate a, b, c, a and b, a and c, b and c, or a, b, and c, where a, b, and c may be singular or plural.

The foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A photovoltaic system, comprising:
a fault isolation circuit; and
a power conversion circuit, wherein a first end of the fault isolation circuit is configured to connect to N photovoltaic strings, wherein a second end of the fault isolation circuit is configured to connect to an input end of the power conversion circuit, and wherein N is an integer greater than or equal to 2; and
wherein the fault isolation circuit comprises a multipole switch having multiple poles of switches, wherein the multipole switch is configured to connect to N photovoltaic strings to divide the N photovoltaic strings into M groups, wherein M is an integer greater than or equal to 2, wherein the input end of the power conversion circuit is connected to a first one of a positive end or negative end of each group of photovoltaic strings in the N photovoltaic strings through a same first pole of switch in the multipole switch, wherein each second one of the positive end or negative end of each group of photovoltaic strings is connected to the input end of the power conversion circuit through a second pole that is of second poles of the switch in the multipole switch and that is separate from each other second pole of the second poles, and wherein at least one group of photovoltaic strings comprises at least two photovoltaic strings; and
wherein the multipole switch is configured to, in response to a reverse connection fault occurring in any photovoltaic string of the N photovoltaic strings, turn off in linkage and disconnect the N photovoltaic strings from the power conversion circuit by opening all of the second poles to disconnect all of the photovoltaic strings of all of the M groups of photovoltaic strings from the power conversion circuit.

2. The photovoltaic system according to claim 1, wherein positive electrodes of the N photovoltaic strings are configured to connect to the input end of the power conversion circuit through one pole of switch in the multipole switch, every two of the N photovoltaic strings form a group, and negative electrodes of each group of photovoltaic strings are configured to connect to the input end of the power conversion circuit through a separate pole of switch in the multipole switch; or
wherein the negative electrodes of the N photovoltaic strings are configured to connect to the input end of the power conversion circuit through one pole of switch in the multipole switch, every two of the N photovoltaic strings form a group, and positive electrodes of each group of photovoltaic strings are configured to connect to the input end of the power conversion circuit through a separate pole of switch in the multipole switch.

3. The photovoltaic system according to claim 2, wherein the N photovoltaic strings are divided into the M groups, and when N is an even number, M=N/2, or when N is an odd number, M=(N+1)/2; and
the fault isolation circuit comprises an (M+1)-pole switch, the (M+1)-pole switch comprises a first pole of switch and other M poles of switches, the M groups of photovoltaic strings are in a one-to-one correspondence with the M poles of switches, first ends of the N photovoltaic strings are configured to connect to the input end of the power conversion circuit through the first pole of switch, the M groups of photovoltaic strings are configured to connect to the input end of the power conversion circuit through the M poles of switches respectively, and the first ends of the N photovoltaic strings are the positive electrodes or the negative electrodes.

4. The photovoltaic system according to claim 3, further comprising a controller, wherein the fault isolation circuit further comprises a shunt tripping apparatus; and
the controller is configured to: in response to a reverse connection fault occurring in the N photovoltaic strings, send a disconnection instruction to the shunt tripping apparatus, the shunt tripping apparatus acts according to the disconnection instruction and drives the entire (M+1)-pole switch to be turned off, and the entire (M+1)-pole switch remains in an off state before the shunt tripping apparatus is reset.

5. The photovoltaic system according to claim 4, further comprising an input current detection circuit, wherein:
the input current detection circuit is configured to detect a current of each of the N photovoltaic strings; and
the controller is configured to: in response to determining, based on the current of each photovoltaic string, that a current of any one of the N photovoltaic strings is reversed, control the entire (M+1)-pole switch to be turned off.

6. The photovoltaic system according to claim 4, further comprising an input current detection circuit and an input voltage detection circuit, wherein:

the input current detection circuit is configured to detect a current of each of the N photovoltaic strings;

the input voltage detection circuit is configured to detect a voltage between a first end of the first pole of switch and a first end of each of the M poles of switches to obtain M voltages; and the controller is configured to: in response to at least one of the M voltages being less than a first voltage threshold and a current of at least one of the N photovoltaic strings being greater than a first current threshold, control the entire (M+1)-pole switch to be turned off.

7. The photovoltaic system according to claim 4, wherein the power conversion circuit comprises a DC/DC conversion circuit.

8. The photovoltaic system according to claim 7, further comprising an output voltage detection circuit and an output current detection circuit, wherein:

the output current detection circuit is configured to detect a current at a second end of the first pole of switch;

the output voltage detection circuit is configured to detect an output voltage of the DC/DC conversion circuit; and the controller is configured to: in response to the current at the second end of the first pole of switch being greater than a second current threshold and a voltage at an output end of the DC/DC conversion circuit being lower than a second preset voltage, control the entire (M+1)-pole switch to be turned off.

9. The photovoltaic system according to claim 7, wherein the controller comprises a primary controller and a secondary controller; and both the primary controller and the secondary controller are configured to: in response to the reverse connection fault occurring in the N photovoltaic strings, control the entire (M+1)-pole switch to be turned off.

10. The photovoltaic system according to claim 9, further comprising a primary auxiliary source and a secondary auxiliary source, wherein:

both the primary auxiliary source and the secondary auxiliary source are configured to supply power to the primary controller and the secondary controller;

the primary auxiliary source is configured to connect to an output end of the DC/DC conversion circuit; and the secondary auxiliary source is configured to connect to the first end of the fault isolation circuit.

11. The photovoltaic system according to claim 10, further comprising a first power obtaining circuit, wherein:

the first power obtaining circuit is configured to obtain power from a group of photovoltaic strings with a highest voltage in the M groups of photovoltaic strings to supply power to the secondary auxiliary source.

12. The photovoltaic system according to claim 11, wherein the first power obtaining circuit comprises 2×(M+1) diodes and a first capacitor;

each pole of switch in the (M+1)-pole switch corresponds to two of the 2×(M+1) diodes; and the first end of each pole of switch in the (M+1)-pole switch is connected to a first end and a second end of the first capacitor through a forward bias diode and a reverse bias diode respectively, the first end of each pole of switch in the (M+1)-pole switch is connected to a corresponding photovoltaic string, and a second end of each pole of switch in the (M+1)-pole switch is connected to an input end of the DC/DC conversion circuit.

13. The photovoltaic system according to claim 10, further comprising a second power obtaining circuit, wherein:

the second power obtaining circuit comprises a first diode, a second diode, a third diode, a fourth diode, and a second capacitor;

a cathode and an anode of the first diode are connected to a positive output end of the DC/DC conversion circuit and a first end of the second capacitor respectively, and an anode and a cathode of the second diode are connected to the positive output end of the DC/DC conversion circuit and a second end of the second capacitor respectively;

an anode and a cathode of the third diode are connected to the first end of the second capacitor and a negative output end of the DC/DC conversion circuit respectively, and an anode and a cathode of the fourth diode are connected to the negative output end of the DC/DC conversion circuit and the second end of the second capacitor respectively; and the primary auxiliary source is connected to the positive output end of the DC/DC conversion circuit.

14. The photovoltaic system according to claim 7, comprising a plurality of fault isolation circuits and a plurality of DC/DC conversion circuits, wherein:

the plurality of fault isolation circuits is in a one-to-one correspondence with the plurality of DC/DC conversion circuits.

15. The photovoltaic system according to claim 3, wherein the power conversion circuit comprises a DC/AC conversion circuit.

16. A direct-current combiner box, comprising:

a plurality of fault isolation circuits; and a plurality of DC/DC conversion circuits, wherein the plurality of fault isolation circuits are in a one-to-one correspondence with the plurality of DC/DC conversion circuits;

wherein a first end of each fault isolation circuit of the plurality of fault isolation circuits is connected to N photovoltaic strings, and a second end of each fault isolation circuit is connected to an input end of a respective DC/DC conversion circuit of the plurality of DC/DC conversion circuits;

wherein each fault isolation circuit of the plurality of fault isolation circuits comprises a multipole switch having multiple poles of switches, wherein the multipole switch is configured to connect to N photovoltaic strings to divide the N photovoltaic strings into M groups, wherein M is an integer greater than or equal to 2, wherein an input end of each DC/DC circuit of the plurality of DC/DC conversion circuits is connected to a first one of a positive end or negative end of a group of photovoltaic strings in the N photovoltaic strings through a same first pole of the multipole switch, wherein each second one of the positive end or negative end of each group of photovoltaic strings is connected to the input end of the DC/DC circuit through a second pole that is of second poles of the multipole switch and that is separate from each other second pole of the second poles, and wherein at least one group of photovoltaic strings comprises at least two photovoltaic strings; and wherein the multipole switch is configured to, in response to a reverse connection fault occurring in any connected photovoltaic strings that are of the N photovoltaic strings and that are connected to the fault isolation circuit having the respective multipole switch, turn off, in linkage, the entire multipole switch and disconnect the connected photovoltaic strings from the respective DC/DC conversion circuit by opening all of the second poles to disconnect all of the photovoltaic strings of all of the M groups of photovoltaic strings from the respective DC/DC conversion circuit.

17. The direct-current combiner box according to claim 16, wherein each fault isolation circuit further comprises a shunt tripping apparatus and a controller; and the controller is configured to: in response to a reverse connection fault occurring in the N photovoltaic strings, send a disconnection instruction to the shunt tripping apparatus, the shunt tripping apparatus acts according to the disconnection instruction and drives the entire multipole switch to be turned off, and the entire multipole switch remains in an off state before the shunt tripping apparatus is reset.

18. A fault isolation method, applied to a photovoltaic system, wherein the photovoltaic system comprises a fault isolation circuit and a power conversion circuit, wherein a first end of the fault isolation circuit is connected to N photovoltaic strings, wherein a second end of the fault isolation circuit is connected to the power conversion circuit, wherein the fault isolation circuit comprises a multipole switch having multiple poles of switches, wherein the multipole switch is configured to connect to N photovoltaic strings to divide the N photovoltaic strings into M groups, wherein M is an integer greater than or equal to 2, wherein an input end of the power conversion circuit is connected to a first one of a positive end or negative end of each group of photovoltaic strings in the N photovoltaic strings through a same first pole of switch in the multipole switch, wherein each second one of the positive end or negative end of each group of photovoltaic strings is connected to the input end of the power conversion circuit through a second pole that is of second poles of the switch in the multipole switch and that is separate from each other second pole of the second poles, and wherein at least one group of photovoltaic strings comprises at least two photovoltaic strings; and wherein the method comprises:

determining that a reverse connection fault occurs in any photovoltaic string of the N photovoltaic strings, and controlling the entire multipole switch to be turned off in linkage and disconnect the N photovoltaic strings from the power conversion circuit by opening all of the second poles to disconnect all of the photovoltaic strings of all of the M groups of photovoltaic strings from the power conversion circuit.

19. The method according to claim 18, wherein the determining that a reverse connection fault occurs in the N photovoltaic strings specifically comprises:

obtaining a current of each of the N photovoltaic strings; and determining, based on the current of each photovoltaic string, that a current of any one of the N photovoltaic strings is reversed, and determining that a reverse connection fault occurs in the N photovoltaic strings.

20. The method according to claim 19, wherein obtaining a current of each of the N photovoltaic strings comprises:

detecting a voltage between a first end of first pole of the multipole switch and a first end of each other multiple switch to obtain M voltages; and in response to at least one of the M voltages being less than a first voltage threshold and a current of at least one of the N photovoltaic strings being greater than a first current threshold, controlling the entire multipole switch to be turned off.

* * * * *